United States Patent
Naim et al.

(10) Patent No.: US 7,263,354 B2
(45) Date of Patent: Aug. 28, 2007

(54) METHOD AND SYSTEM FOR PROVIDING WIRELESS SERVICES USING AN ACCESS NETWORK AND A CORE NETWORK BASED ON DIFFERENT TECHNOLOGIES

(75) Inventors: Ghassan Naim, Garland, TX (US); Jianming Xu, Plano, TX (US); Pardeep Kohli, Plano, TX (US); Seshagiri R. Madhavapeddy, Richardson, TX (US); Mahbubul Alam, Dallas, TX (US)

(73) Assignee: Alcatel Wireless, Inc., Plano, TX (US)

( * ) Notice: Subject to any disclaimer, the term of this patent is extended or adjusted under 35 U.S.C. 154(b) by 127 days.

(21) Appl. No.: 10/494,912

(22) PCT Filed: Nov. 5, 2002

(86) PCT No.: PCT/US02/35500

§ 371 (c)(1),
(2), (4) Date: May 7, 2004

(87) PCT Pub. No.: WO03/043358

PCT Pub. Date: May 22, 2003

(65) Prior Publication Data

US 2005/0026646 A1    Feb. 3, 2005

Related U.S. Application Data

(60) Provisional application No. 60/345,050, filed on Nov. 9, 2001.

(51) Int. Cl.
*H04Q 7/20* (2006.01)

(52) U.S. Cl. ............... 455/422.1; 455/466; 455/432.2; 455/433; 455/445; 455/428; 370/338; 709/206

(58) Field of Classification Search ................ 455/436, 455/437, 439, 442, 445, 446, 458, 428, 435.2, 455/552.1, 451, 448, 422.1, 432.2, 433–434, 455/560; 370/338, 395.2, 389, 342, 335, 370/349, 310–328; 709/206, 223, 222.6, 709/246

See application file for complete search history.

(56) References Cited

U.S. PATENT DOCUMENTS 6,374,112 B1    4/2002    Widegren et al.

(Continued)

*Primary Examiner*—George Eng
*Assistant Examiner*—Kamran Afshar
(74) *Attorney, Agent, or Firm*—Jessica Smith; Bobby D. Slaton; Craig A. Hoersten

(57) ABSTRACT

Provided is a method and system for enabling mobile devices, radio access networks (RANs), and core networks (CNs) based on different specifications and underlying technologies to communicate. The mobile device and the RAN may be based on one technology, such as a code division multiple access (CDMA) specification, while the CN may be based on another technology, such as a global system for mobile communications (GSM) specification. The method takes a CDMA message received by the RAN, converts it into a corresponding GSM message, and passes it to the CN. Alternatively, a new GSM message may be created. Similarly, a GSM message from the CN may be converted into a CDMA message (or a new CDMA message may be created) and the CDMA message passed on to the RAN. The method may also initiate a function or procedure in one portion of a network using one technology when a certain message is received from another portion of the network using a different technology. This provides a cost-effective and flexible process that, among other advantages, enables the mobile device to communicate with incompatible CNs.

8 Claims, 21 Drawing Sheets

U.S. PATENT DOCUMENTS

| | | | |
|---|---|---|---|
| 6,681,111 B2 * | 1/2004 | Ahn et al. | 455/432.2 |
| 6,788,959 B2 * | 9/2004 | Jokinen et al. | 455/552.1 |
| 6,937,862 B2 * | 8/2005 | Back et al. | 455/445 |
| 7,079,519 B2 * | 7/2006 | Lee et al. | 370/338 |
| 2001/0014610 A1 | 8/2001 | Biedermann | |
| 2001/0034234 A1 | 10/2001 | Palat et al. | |
| 2001/0046863 A1 * | 11/2001 | Rinne et al. | 455/442 |
| 2003/0169725 A1 * | 9/2003 | Ahmavaara et al. | 370/352 |
| 2004/0157600 A1 * | 8/2004 | Stumpert et al. | 455/435.2 |
| 2004/0203640 A1 * | 10/2004 | Molander et al. | 455/466 |
| 2005/0083918 A1 * | 4/2005 | Tian | 370/356 |
| 2005/0099990 A1 * | 5/2005 | Uusikartano et al. | 370/349 |
| 2005/0159158 A1 * | 7/2005 | Pardeep et al. | 455/436 |
| 2005/0215245 A1 * | 9/2005 | Tian et al. | 455/422.1 |
| 2006/0050680 A1 * | 3/2006 | Naim et al. | 370/352 |

* cited by examiner

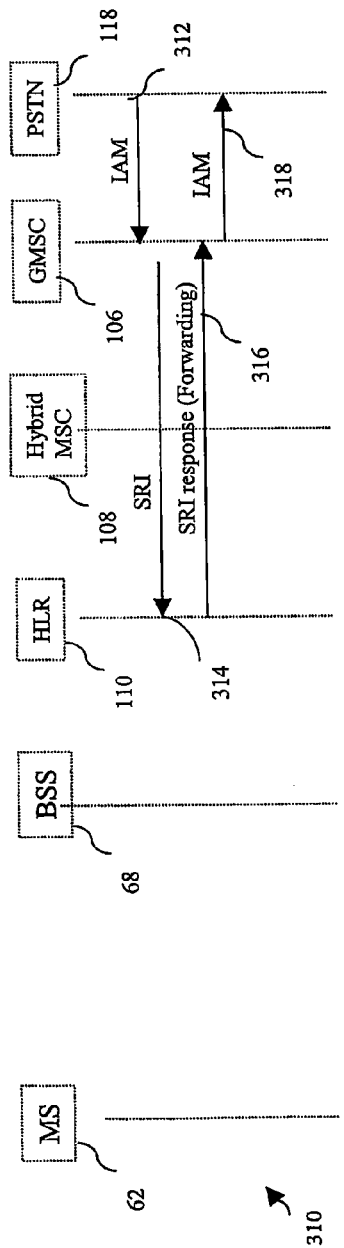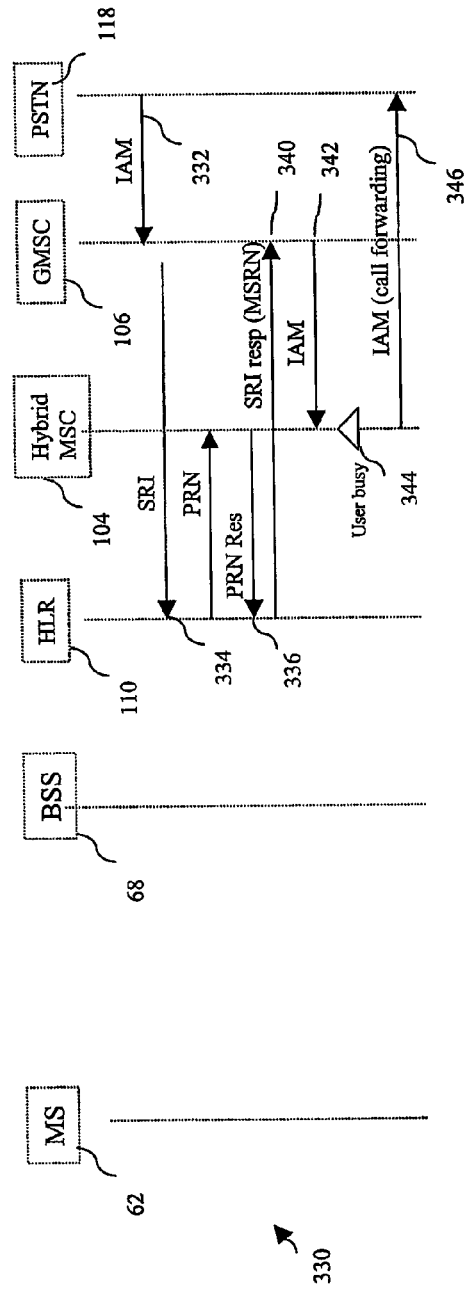

METHOD AND SYSTEM FOR PROVIDING WIRELESS SERVICES USING AN ACCESS NETWORK AND A CORE NETWORK BASED ON DIFFERENT TECHNOLOGIES

CROSS-REFERENCE

This application claims priority from U.S. Provisional Patent Application 60/345,050, filed on Nov. 9, 2001.

BACKGROUND

The present disclosure relates generally to voice and data communications, and more particularly, to a wireless system and method for providing communication services to a wireless mobile user of a wireless access network based on one technology through a wireless core network based on a different technology.

A wireless network may be composed of two sub-networks. The first sub-network may be a Radio Access Network (RAN) which handles radio related issues, such as assigning radio resources to establish and maintain a communication session with a mobile communications device upon a request for service. The second sub-network may be a Core Network (CN) which links a user of a mobile device to a wireline network. The wireless network, its sub-networks, and mobile devices within the network may communicate using a standardized set of signals and commands known as a specification.

Available specifications for the wireless network may specify that the RAN and the CN of the wireless network are based on the same wireless technology. For instance, if the RAN and the CN are based on a technology such as Global System for Mobile communications (GSM), a mobile subscriber using a GSM compliant device may utilize the network. Likewise, if the RAN and the CN are based on a technology such as code division multiple access 2000 (CDMA2000), a mobile subscriber using a CDMA2000 compliant device may utilize the network.

However, due in part to incompatibilities between different specifications, such as GSM and CDMA2000, a mobile device may only be able to utilize networks based on a particular specification. For example, a mobile device compliant with GSM cannot access a network based on CDMA2000. Accordingly, the mobile device may be unable to provide a user with service if a GSM network is not available. This may limit the mobile device to a geographical service area that includes networks that support the particular wireless technology of the mobile device. As the number of differing existing and proposed specifications grows, this limitation may become increasingly problematic.

One approach that has been developed to overcome the limitations imposed by multiple specifications utilizes a dual-mode wireless mobile device that can operate in networks based on different wireless technologies. For example, the mobile device may operate using either CDMA or GSM, and so may switch its mode of operation between CDMA and GSM depending on the technology underlying the network in which the mobile device is currently located. Accordingly, the mobile device may utilize GSM when in a GSM-based network and switch to CDMA when in a CDMA-based network.

However, this dual-mode solution introduces additional complications. For example, a CDMA-based RAN may offer a relatively high quality of service compared to a GSM-based RAN. Therefore, the quality of service offered by the mobile device may be downgraded when moving from the CDMA network into the GSM network. While this degradation in service quality enables the service to be maintained, it presents an undesirable compromise. In addition, such degradation may result in lower data rates on a radio link (e.g., a link between the mobile device and a radio tower in a network), lower revenue for the network operator, and a lower number of supportable subscribers. Network congestion can further increase the degradation. Accordingly, at some point, a mobile user switching to the GSM network while on a voice or data call may lose service. Another complication presented by the dual-mode solution is that CDMA2000 may offer a higher spectrum efficiency than GSM. From a network resource perspective, the GSM RAN may not utilize the available radio resources as efficiently as the CDMA RAN. Accordingly, such inefficiency may result in such undesirable factors as fewer simultaneous users and lower revenue. Therefore, what is needed is a method and system that can provide wireless service to a mobile device regardless of the underlying network technology. It is desirable that minimal service degradation occurs when the mobile device is moving from one network to another. It is also desirable to utilize RAN technologies that maximize service quality and revenue. Furthermore, it is desirable to minimize changes to existing network architectures and to be cost effective.

SUMMARY

In one embodiment, a method for providing a wireless service between a telecommunications network and a mobile device is provided. The network includes a first portion based on a first technology and a second portion based on a second technology, while the mobile device is based on the first technology. The first and second technologies are not compatible for purposes of communication. The method includes establishing a communication session between the mobile device and the first portion of the network using the first technology, where the communication session includes at least a first message. The first message is altered to make it compatible with the second technology and the altered first message is passed to the second portion of the network. This enables the mobile device and the second portion to communicate using their respective technologies.

In another embodiment, a method for communicating between first and second technologies in a wireless telecommunications network is provided, where the first and second technologies are unable to directly communicate due to incompatibilities. The method includes detecting a message based on the first technology; analyzing the received message to determine a message type; and initiating a procedure using the second technology, where the initiated procedure is based on the message type of the received message. In still another embodiment, the method also includes analyzing the received message to determine content information, where the initiated procedure is also based on the content information of the received message.

BRIEF DESCRIPTION OF THE DRAWINGS

FIG. 3b is a flow chart of a method for converting messages of one architecture into messages of another architecture in the hybrid wireless network of FIG. 3a.

FIG. 3c is a flow chart of a method for creating a message in one architecture to correspond to a message in another architecture in the hybrid wireless network of FIG. 3a.

FIG. 4 is a call flow diagram illustrating the registration of a mobile device in the hybrid wireless network of FIG. 3a.

FIG. 5 is a call flow diagram illustrating the establishment of a call session originating from a mobile device in the hybrid wireless network of FIG. 3a.

FIG. 6 is a call flow diagram illustrating the establishment of a call session originating in a PSTN connected to the hybrid wireless network of FIG. 3a.

FIG. 7 is a call flow diagram illustrating a mobile initiated call release in the hybrid wireless network of FIG. 3a.

FIG. 8 is a call flow diagram illustrating a PSTN initiated call release in the hybrid wireless network of FIG. 3a.

FIG. 9 is a call flow diagram illustrating a call forwarding—unconditional service in the hybrid wireless network of FIG. 3a.

FIG. 10 is a call flow diagram illustrating a call forwarding—busy service in the hybrid wireless network of FIG. 3a.

FIG. 11 is a call flow diagram illustrating a call forwarding—not reachable service in the hybrid wireless network of FIG. 3a.

FIG. 12 is a call flow diagram illustrating a call forwarding—no answer service in the hybrid wireless network of FIG. 3a.

FIG. 13 is a call flow diagram illustrating a call barring—incoming call service in the hybrid wireless network of FIG. 3a.

FIG. 14 is a call flow diagram illustrating a call barring—outgoing call service in the hybrid wireless network of FIG. 3a.

FIG. 15 is a call flow diagram illustrating a call waiting and call hold service in the hybrid wireless network of FIG. 3a.

FIG. 16 is a call flow diagram illustrating a three way call service in the hybrid wireless network of FIG. 3a.

FIG. 17 is a call flow diagram illustrating a supplementary service activation procedure in the hybrid wireless network of FIG. 3a.

FIG. 18 is a call flow diagram illustrating a packet data session originated by a mobile device in the hybrid wireless network of FIG. 3a.

FIG. 19 is a call flow diagram illustrating charging a call originating from a mobile device in the hybrid wireless network of FIG. 3a.

FIG. 20 is a call flow diagram illustrating a procedure for charging an account associated with a mobile device for a call originating from a PSTN in the hybrid wireless network of FIG. 3a.

DETAILED DESCRIPTION

Figure 1:
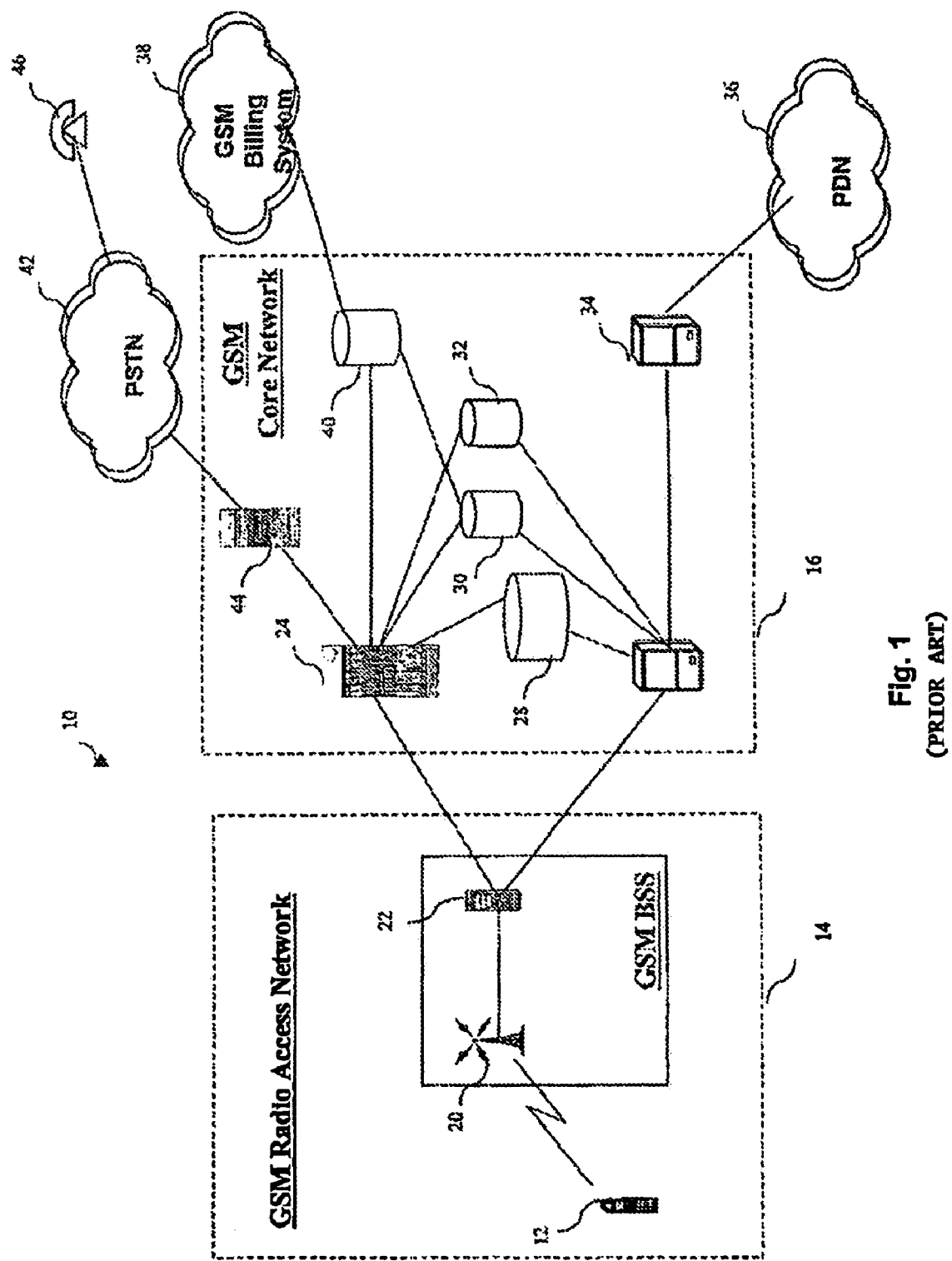
FIG. 1 illustrates a GSM wireless network architecture for providing services to a mobile user.

The present disclosure relates to voice and data communications, and more particularly, to a system and method for providing communication services to a wireless mobile user of a wireless access network based on one technology through a wireless core network based on a different technology. It is understood, however, that the following disclosure provides many different embodiments, or examples, for implementing different features of the invention. Specific examples of components and arrangements are described below to simplify the present disclosure. These are, of course, merely examples and are not intended to be limiting.

In addition, the present disclosure may repeat reference numerals and/or letters in the various examples. This repetition is for the purpose of simplicity and clarity and does not in itself dictate a relationship between the various embodiments and/or configurations discussed.

For the purposes of clarity in the present disclosure, various acronyms are used, and the definitions of which are listed below:
ANSI-41 American National Standards Institute—Cellular Radio Telecommunications Intersystem Operations;
AuC Authentication center;
BSC Base Station Controller;
BSS Base Station Subsystem;
BTS Base Transceiver Station;
GMSC Gateway MSC;
GSM Global System for Mobile communications;
HLR Home Location Register;
IP Internet Protocol;
IS41 Wireless Network conforming to the IS41 standard;
ISDN Integrated Services Digital Network;
ISUP ISDN User Part (of SS7);
MSC Mobile Switching Center;
PSTN Public Switch Telephone Network;
SCP Signalling Control Point;
SMS-C Short Message Service Center;
SS7 Signaling System No. 7;
T1 Digital communication line that uses time division multiplexing;
TCP/IP Transmission Control Protocol/Internet Protocol.

Referring to FIG. 1, an exemplary GSM network 10 is operable to provide wireless services to a GSM compliant mobile device 12 (also known as a "mobile station" (MS)). The network 10 includes a RAN 14 and a CN 16, both of which are based on GSM technology. The RAN 14 includes a BSS 18, which may include a BTS 20 and a BSC 22 to establish and maintain a communication session with the mobile device 12. In the present example, the BSC 22 may be in communication with a MSC 24 and a Serving General Packet Radio Service (GPRS) Support Node (collectively "SGSN") 26. Both the MSC 24 and the SGSN 26 may be connected to a SMS-C 28, an HLR 30, and an AuC 32. The SGSN 26 may also be connected to a Gateway GPRS Support Node (GGSN) 34, which may in turn connect to a packet data network (PDN) 36. The MSC 22 and the HLR 30 may also be connected to a billing system 38 through a SCP 40. The MSC 22 may also be connected to another network, such as a PSTN 42, through a GMSC 44. This connection enables the mobile device 12 to communicate with another device that is not part of the network 10, such as a wireline telephone 46.

It is noted that a variety of protocols may be utilized to enable communications to occur through the various components 20-44. For example, some communications may use Signaling System 7 Integrated Services Digital Network (ISDN) User Part (known collectively as "SS7 ISUP") or Internet Protocol (IP), while others may utilize GPRS Tunneling Protocol U (GTP-U) for user data and GTP-C for signaling.

Figure 2:
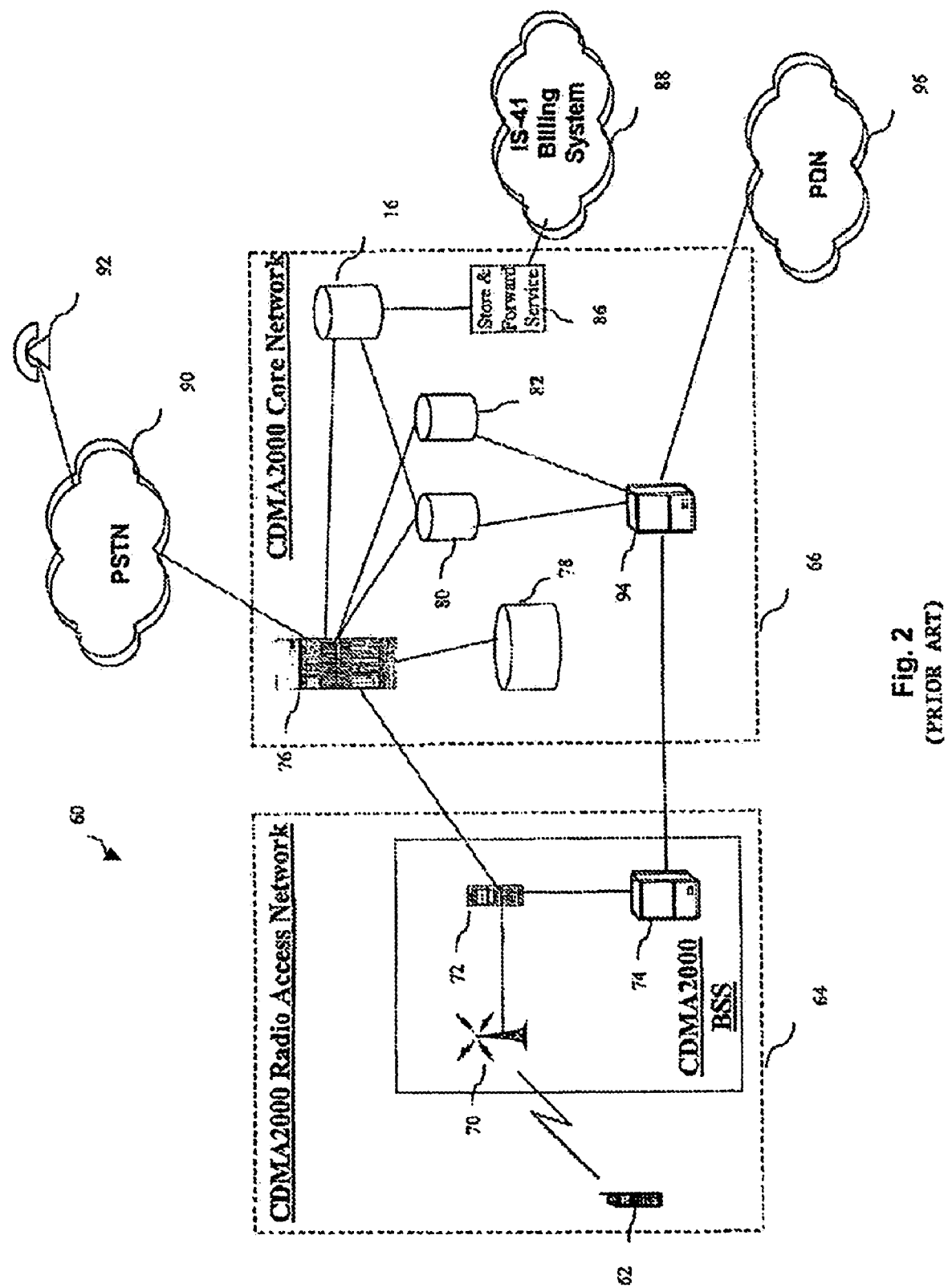
FIG. 2 illustrates a CDMA2000 wireless network architecture for providing services to a mobile user.

Referring now to FIG. 2, an exemplary CDMA2000 network 60 is operable to provide wireless services to a CDMA2000 compliant mobile device 62. The network 60 includes a RAN 64 and a CN 66, both of which are based on CDMA2000 technology. The RAN 64 includes a BSS 68, which may include a BTS 70, a BSC 72, and a packet control function (PCF) 74. In the present example, the BSC 22 may be in communication with a MSC 76 and the PCF 74. The MSC 76 may be connected to a SMS-C 78, a HLR 80, an AuC 82, and a SCP 84. The SCP 84 may be connected to a component 86 that is operable to store and forward a service to a billing system 88.

Alternatively, the SCP 84 may store and forward the service itself. The MSC 76 may also be connected to another network, such as a PSTN 90. This connection enables the mobile device 62 to communicate with a device on another network, such as a wireline telephone 92 connected to the PSTN 90. The PCF 74 may be connected to a packet data serving node (PDSN) 90 as well as the BSC 72. The PDSN 90 may in turn be connected to the HLR 80, the SCP 82, and a PDN 96. It is noted that a variety of protocols may be utilized to enable communications to occur through the various components 70-96. For example, some communications may use SS7 ISUP, while others may utilize IP.

Figure 3A:
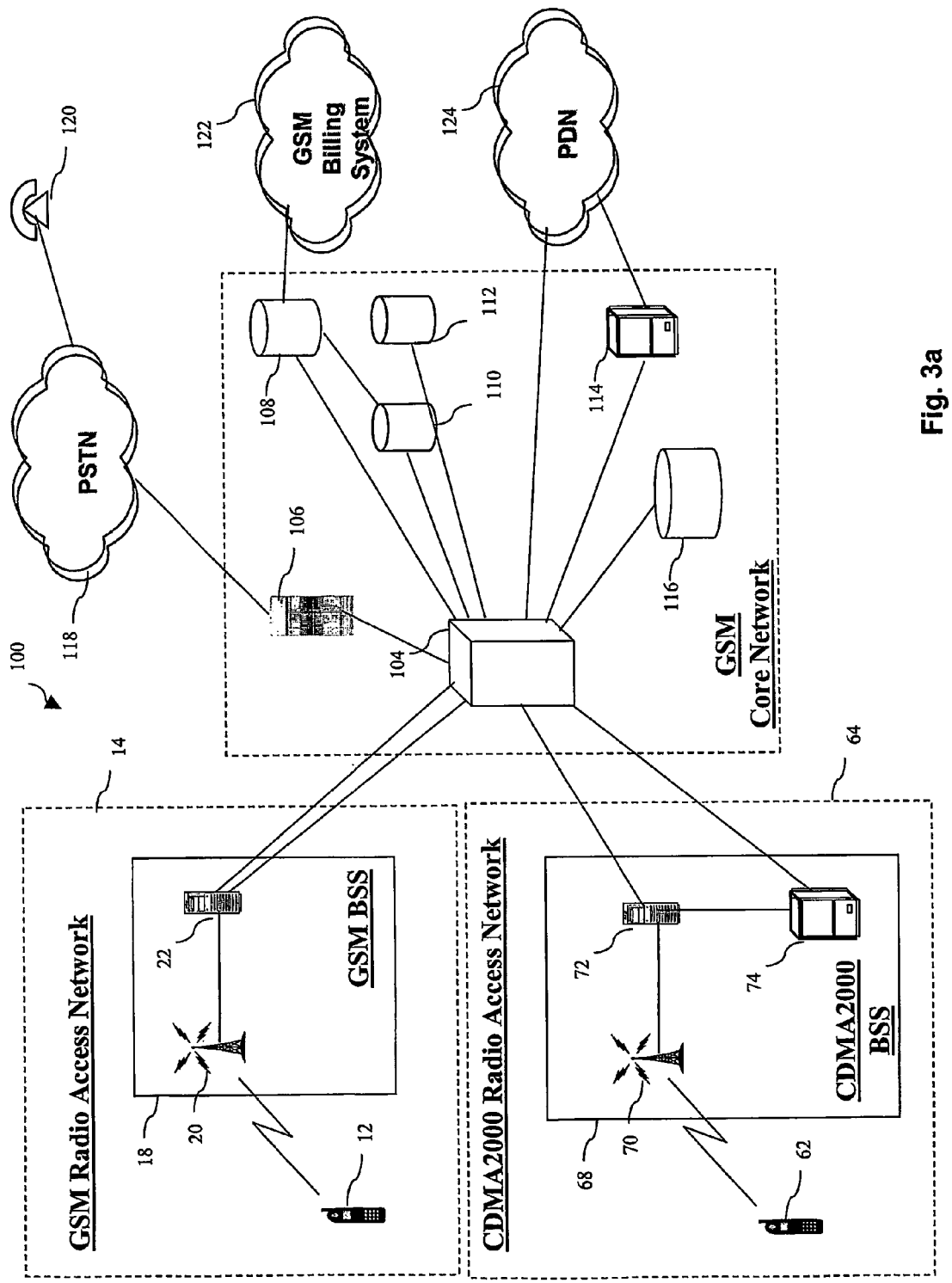
FIG. 3a illustrates a hybrid wireless network architecture with a hybrid Mobile Switching Center, a RAN using CDMA2000 wireless technology, and a CN using GSM wireless technology.

Referring now to FIG. 3*a*, in one embodiment, a network 100 is operable to service both the GSM compliant mobile device 12 of FIG. 1 and the CDMA2000 compliant mobile device 62 of FIG. 2. Although the mobile devices 12, 62 may support both voice and packet data, the present disclosure applies to any type of mobile device that can operate in a given RAN. For example, one or both of the mobile devices 12, 62 may be a single mode mobile device that can support either voice or data, a dual mode mobile device that can support voice and data but at different times of service, or may be one of plurality of other combinations of mobile types and services. Furthermore, although illustrated as mobile telephones, the mobile devices 12, 62 may be any type of device able to connect to the network 100.

The network 100 is structured so as to connect RANs based on different technologies with a single CN. In the present example, the network 100 connects the GSM RAN 14 of FIG. 1 and the CDMA2000 RAN 64 of FIG. 2 with a GSM CN 102. A "hybrid" MSC 104 is utilized to connect the RANs 14, 64 with the CN 102 as will be described later in greater detail. It is understood that one or more of the elements/steps of the present disclosure may be implemented using software and hardware to develop the hybrid MSC 104, which may then be deployed in the wireless network.

In the present example, the MSC 104 may be connected to a GMSC 106, SCP 108, a HLR 110, an AuC 112, a GGSN 114, and a SMS-C 116. The GMSC 106 may be connected to another network, such as a PSTN 118. This connection may be operable to enable one or both of the mobile devices 12, 62 to communicate with a device on another network, such as a wireline telephone 120 on the PSTN 118. The SCP 108 may be connected to a billing system 122. A PDN 124 may be connected to both the MSC 104 and the GGSN 114.

Figure 3B:
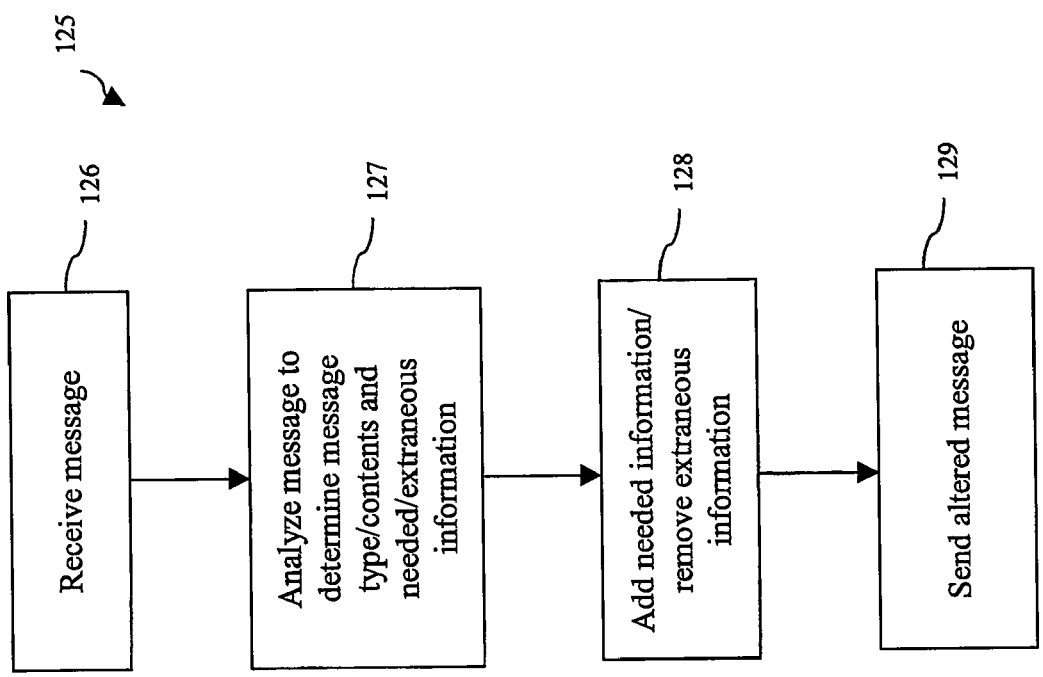

In operation, as will be described below in greater detail, the MSC 104 may handle the control and bearer traffic using a centralized call control model for both the GSM RAN 14 and the CDMA2000 RAN 64. Setting-up and controlling a voice or a data call for either of the mobile devices 12, 62 may be done at the MSC 104 as follows. For calls established using the GSM mobile device 12, the MSC 104 operates in a manner similar to the GSM MSC 24 of FIG. 1. For calls established using the CMDA2000 mobile device 62, the MSC 104 links the CDMA2000 RAN 64 to the GSM CN 102. This linking may be accomplished by converting messages initiated in the CDMA2000 RAN 64 into GSM messages sent to the CN 102 as illustrated in FIG. 3*b*. Likewise, GSM messages initiated by the CN 102 may be converted into CDMA2000 messages sent to the RAN 64. Alternatively, the MSC 104 may create a new message that corresponds to a received message as illustrated in FIG. 3*c*.

The linking between the CDMA2000 RAN 64 and the GSM CN 102 may also be accomplished by initiating a function or procedure in one portion of the network 100 using one technology (e.g., CDMA or GSM) upon receiving a certain message another portion of the network 100 using the other technology (e.g., GSM or CDMA). Accordingly, the GSM CN 102 may communicate with both the GSM RAN 14 and the CDMA2000 RAN 64, and so enables setup calls to be initiated at one of the RANs 14, 64 or initiated at the CN 102.

Referring now to FIG. 3*b* and with continued reference to FIG. 3*a*, a method 125 for converting messages is illustrated. In step 126, a message is received by the MSC 104. In the present example, the received message is a CDMA2000 message and is to be converted into a GSM message. The message is analyzed in step 127 to determine information such as message type, parameters (if applicable), etc., and the analyzed message is compared to existing GSM message types to identify a corresponding GSM message. For example, this may be a lookup in a database table or may be a more detailed comparison. The analysis may identify information contained in the message that is extraneous (e.g., CDMA2000 message information) and information not in the message that needs to be included (e.g., GSM message information). In step 128, extraneous information may be removed and needed information may be added. The converted message is then sent to the GSM portion of the network.

Figure 3C:
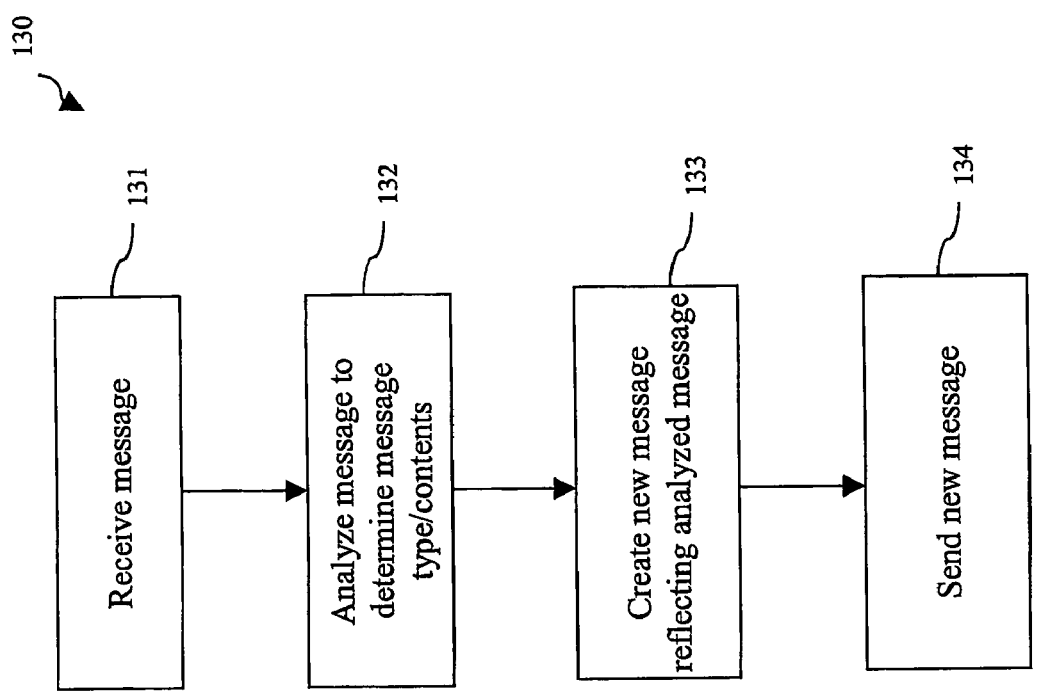

Referring now to FIG. 3*c* and with continued reference to FIG. 3*a*, a method 130 for creating a corresponding message is illustrated. In step 131, a message is received by the MSC 104. In the present example, the received message is a CDMA2000 message and a corresponding GSM message is to be created. The message is analyzed in step 132 to determine information such as message type, parameters (if applicable), etc. and, based on the information extracted from the message, a corresponding GSM message is identified. The analysis may identify information contained in the CDMA2000 message that is extraneous (e.g., CDMA2000 message information), as well as other information that may be converted to GSM format for insertion into the GSM message. Also the analysis may identify missing information (from a GSM perspective) in the CDMA2000 message that needs to be included in the GSM message. In step 133, a new GSM message is created using the converted information from the CDMA2000 message and new information to replace the missing information, and so the new message may be a transposition of the received message. The created message is then sent to the GSM portion of the network in step 134.

Another method for linking the RAN 64 with the CN 102 may include initiating a function or procedure in one portion of the network 100 (e.g., the CN 102) using one technology (e.g., GSM) upon receipt of a certain message from another portion of the network 100 (e.g., the RAN 64) using another technology (e.g., CDMA2000). The initiated procedure may convert the received message from one technology into another message of a different technology and send the converted message on to the other portion of the network 100. Alternatively, the procedure may create a new message based on the received message and send the new message on to the other portion of the network 100.

Referring again specifically to FIG. 3*a*, the network architecture illustrates exemplary interconnections between the different network entities, including the hybrid MSC 104. The network architecture presented provides voice and packet data services to mobile stations in either network.

The hybrid MSC 104 supports voice and packet data call services to mobile devices from multiple RANs to multiple networks. For instance, the mobile device 12 in the GSM RAN 14 may make a call to the mobile device 62 in the CDMA2000 RAN 64, the telephone 120 connected to the PSTN 118, or to a device in communication with the PDN 124 or other network. The hybrid MSC 104 is shown connected to RANs of different technologies, but it is understood that the present disclosure is equally applicable when the MSC 104 is connected to one or more RANs of the same technology.

Figure 4:
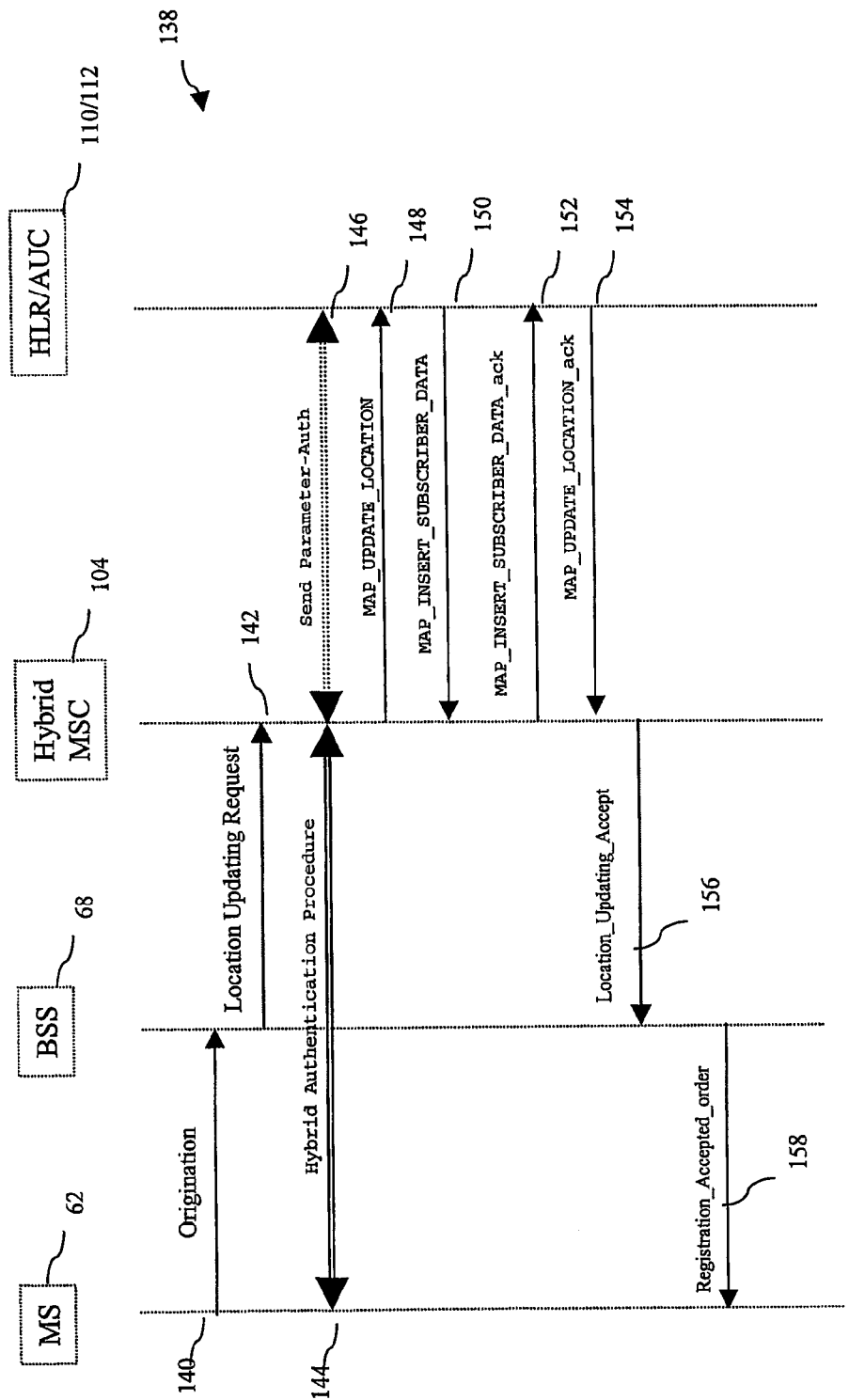

The network 100 provides an economical method and system for providing GSM and CDMA2000 wireless services to mobile users operating in a wireless network composed of a GSM CN and a CDMA2000 or GSM RAN. No changes may be needed in the GSM and CDMA2000 standards that define the protocols used to communicate between network entities for a given technology. In addition, this provides a cost effective solution given that may not introduce changes in existing RAN and CN architectures. This may provide advantages for a network operator or service provider given that there is no need to invest in upgrading existing equipment and that the migration of the services to be supported by the new network may be achieved in less time. Furthermore, when using soft switch technology, the present disclosure enables a relatively high leverage of equipment investment due to higher scalability of the network configuration. Referring now to FIG. 4, in another embodiment, a call flow 138 for registering the mobile device 62 in the RAN 64 and CN 102 of FIG. 3a begins when the mobile device 62 sends an origination message to the BSS 68 in step 140. The origination message may include information such as a Mobile Identification Number (MIN) and an Electronic Serial Number (ESN) of the mobile device 62. If the mobile device 62 is initiating a communication session (rather than simply being activated), the origination message may also include information identifying a desired destination (such as a number for the wireline telephone 120). The BSS 68 sends a message to the MSC 104 in step 142 requesting that the location of the mobile device 62 in the network 100 be updated.

Steps 144 and 146 operate to authenticate the mobile device 62 using a hybrid authentication procedure, which is described in greater detail in U.S. patent application Ser. No. 60/332,154, entitled "Method and System for Passing Information Between a Mobile Terminal and Predetermined Network Entities in a Hybrid Network," and hereby incorporated by reference in its entirety. For example, if the MSC 104 suspects the identification of the mobile device 62, the MSC 104 can challenge the mobile device 62 and require that the mobile device 62 provide authentication information. The mobile device 62 can then send the MSC 104 an authentication challenge response to verify its identity. In step 148, the MSC 104 sends a message to update the location of the mobile device 62 to the HLR 110, which returns a request for data pertaining to the mobile device 62 (e.g., in the form of a MAP_INSERT_SUBSCRIBER_DATA message) in step 150. The data may include restrictions, subscribed services, or similar information that may be stored in the HLR 110. The MSC 104 responds to the data request with an acknowledgment in step 152 and the HLR 110 acknowledges the update location message in step 154. In step 156, the MSC 104 sends a message to the BSS 68 informing the BSS 68 that the request to update the location has been granted. The BSS 68 then informs the mobile device 62 in step 158 that the mobile device 62 has been registered.

It is noted that communications between the mobile device 62, the BSS 68, and the MSC 104 occur as they would in the CDMA2000 based network 60 of FIG. 2. Likewise, communications between the MSC 104 and the HLR 110/AuC 112 occur as they would in the GSM based network 10 of FIG. 1. In the present example, the MSC 104 is responsible for converting the CMDA2000 messages into GSM messages and vice versa, or triggering GSM procedures in the CN 102 based on CDMA messages received from the RAN 64 and vice versa.

Figure 5:
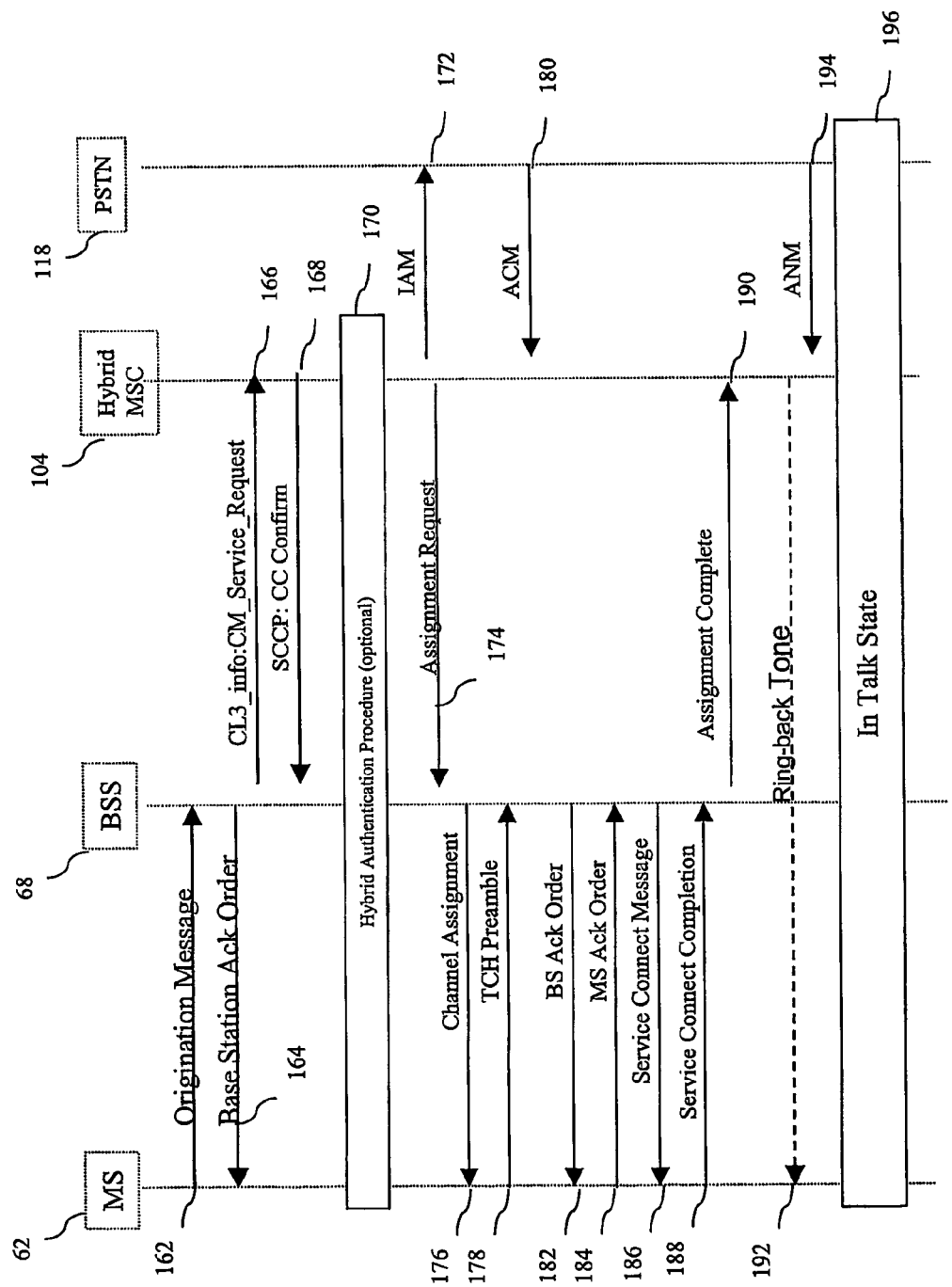

Referring now to FIG. 5, in still another embodiment, a call flow 160 for originating a communication session with the mobile device 62 in the RAN 64 and CN 102 of FIG. 3a is illustrated. The communication session is to include the PSTN 118. For instance, the communication session may connect the mobile device 62 with the wireline telephone 120. The call flow 160 begins when the mobile device 62 sends a request for service in an origination message to the BSS 68 in step 162 as previously described. The BSS 68 acknowledges receipt of the origination message in step 164 and sends a service request to the MSC 104 in step 166. In the present example, the service request is constructed as a connection management service request (CM_Service_Request). The MSC 104 confirms the request in step 168. In the present example, the confirmation may be in the form of a Signaling Connection Control Part (SCCP) connection confirm message (SCCP: CC). In step 170, an authentication process may occur where the mobile device 62 is authenticated as previously described in reference to FIG. 4.

In step 172, the MSC 104 sends an Initial Address Message (IAM) (e.g., a call request packet) to the PSTN 118. The IAM informs the PSTN 118 that the MSC 104 desires to establish a communication channel and may include such information as a telephone number of a destination device. The MSC 104 also sends an assignment request to the BSS 68 in step 174, and the BSS 68 sends a message to the mobile device 62 assigning a communications channel in step 176. The mobile device 62 sends a traffic channel (TCH) preamble message to the BSS 68 in step 178, which may, for example, aid the base station in initial acquisition and channel estimation. The PSTN 118 responds to the IAM of step 172 with an Address Complete Message (ACM), which may be a signaling packet equivalent to a ring-back tone or answer, in step 180. For example, the ACM may be a call setup message indicating that the address signals required for routing the call to the called party have been received.

In step 182, the BSS 68 sends an acknowledgement message to the mobile device 62 and the mobile device 62 sends the BSS 68 an acknowledgement in step 184. The BSS 68 then sends a service connect message to the mobile device 62 in step 186 and the mobile device 172 returns a service connection complete message in step 188. In step 190, the BSS 68 informs the MSC 104 that the channel assignment requested in step 174 is complete. A ring back tone is sent from the MSC 104 to the mobile device 62 through the BSS 68 in step 192, and the PSTN 118 sends an Answer Message (ANM) (e.g., a signaling packet returned to a caller indicating a called party is connected) to the MSC 104 in step 194. Accordingly, using the call flow 160, the communication session is established and in operation in step 196.

Figure 6:
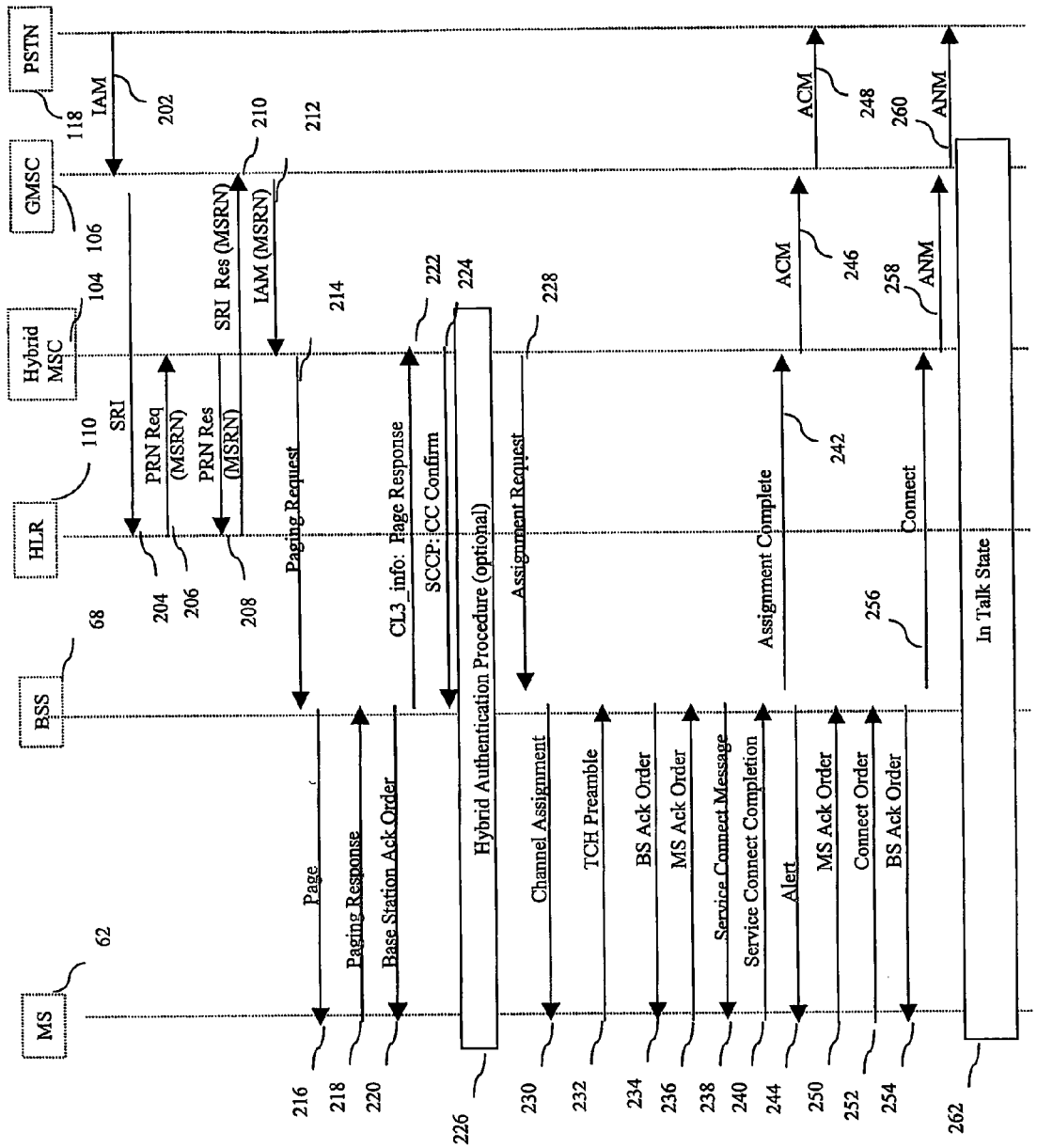

Referring now to FIG. 6, in another embodiment, a call flow 200 illustrates the establishment of a communications session originating from the PSTN 118 of FIG. 3a and terminating at the mobile device 62. The call flow 200 begins when the PSTN 118 sends an IAM to the GMSC 106 in step 202, which notifies the GMSC 106 that the PSTN 118 desires to establish a communication channel. In step 204, the GMSC 106 sends a send routing information (SRI) message to the HLR 110 through the MSC 104 to locate the mobile device 62. To provide the information requested by the SRI message, the HLR 110 sends a provide roaming number (PRN) (or a Mobile Subscriber Roaming Number—MSRN) request to the MSC 104 in step 206. The MSC 104 looks up a roaming number corresponding to the mobile device 62, and returns the number to the HLR 110 in a PRN response in step 208. Upon receiving the response in step 208, the HLR 110 provides the information to the GMSC 106 by sending an SRI response message in step 210.

Upon receiving the SRI response, the GMSC 106 sends a IAM to the MSC 104 in step 212 to request that a communication channel be established. The MSC 104 sends a request that the mobile device 62 be paged in step 214 to the BSS 68, which pages the mobile device 62 in step 216. If the mobile device 62 receives the page (e.g., is activated, is within range, etc.), it sends a response to the BSS 68 in step 218 indicating that the page has been received. The BSS 68 acknowledges the response in step 220, and sends a message to the MSC 104 in step 222 indicating that the mobile device 62 has responded to the page. In step 224, the MSC 104 confirms the connection by sending a connection confirm message to the BSS 68.

In step 226, an authentication process may occur where the mobile device 62 is authenticated as previously described in reference to FIG. 4. The MSC 104 requests that a channel be assigned by sending an assignment request to the BSS 68 in step 228, and the BSS 68 informs the mobile device 62 of the assigned channel in step 230. The mobile device 62 sends a TCH preamble message in step 232 to the BSS 68. In step 234, the BSS 68 sends a message to the mobile device 62 acknowledging the order and the mobile device 62 sends the BSS 68 an acknowledgement in step 236. The BSS 68 then sends a service connect message to the mobile device 62 in step 238 and the mobile device 62 returns a service connection complete message in step 240. In step 242, the BSS 68 informs the MSC 104 that the channel has been assigned as requested in step 228.

The BSS 68 sends an alert message to the mobile device 62 in step 244. In step 246, an ACM is sent from the MSC 104 to the GMSC 106, and from the GMSC 106 to the PSTN 118 in step 248. The mobile device 62 acknowledges the alert in step 250 and sends a connect order to the BSS 68 in step 252. The BSS 68 responds by acknowledging the connect order in step 254 and, in step 256, sending a connect message to the MSC 104. The MSC 104 then sends a ANM through the GMSC 106 to the PSTN 118 in steps 258, 260 to notify the PSTN 118 that the mobile device 62 has been connected. Accordingly, using the call flow 200, the communication session is established and in operation in step 262.

Figure 7:
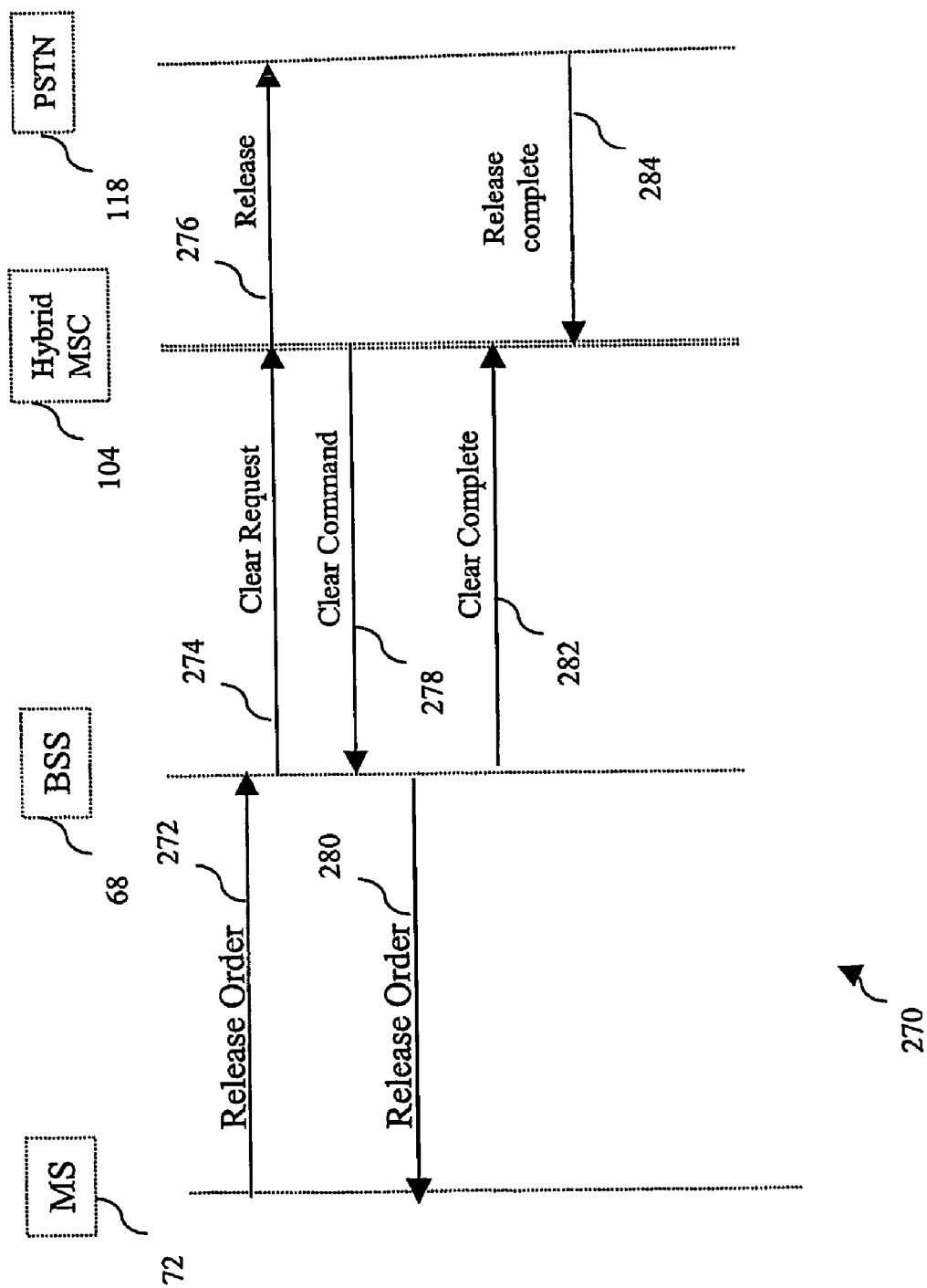

Referring now to FIG. 7, in yet another embodiment, a call flow 270 illustrates the mobile device 62 in the RAN 64 and CN 102 of FIG. 3a terminating (e.g., "clearing") a communication session. The call flow 270 begins when the mobile device 62 issues a release order to the BSS 68 in step 272, notifying the BSS 68 that the mobile device 62 desires to terminate the session. The BSS 68 then sends a clear request to the MSC 104 in step 274 and the MSC 104 sends a release message to the PSTN 118 in step 276. In step 278, the MSC 104 sends a command to the BSS 68 informing the BSS 68 that it is to terminate the communication session. The BSS 68 then sends a release order to the mobile device 62 in step 280, releasing the mobile device 62 from the session. The BSS 68 then informs the MSC 104 in step 282 that the clear has been completed, and the PSTN 118 informs the MSC 104 in step 284 that the PSTN 118 has released the session.

Figure 8:
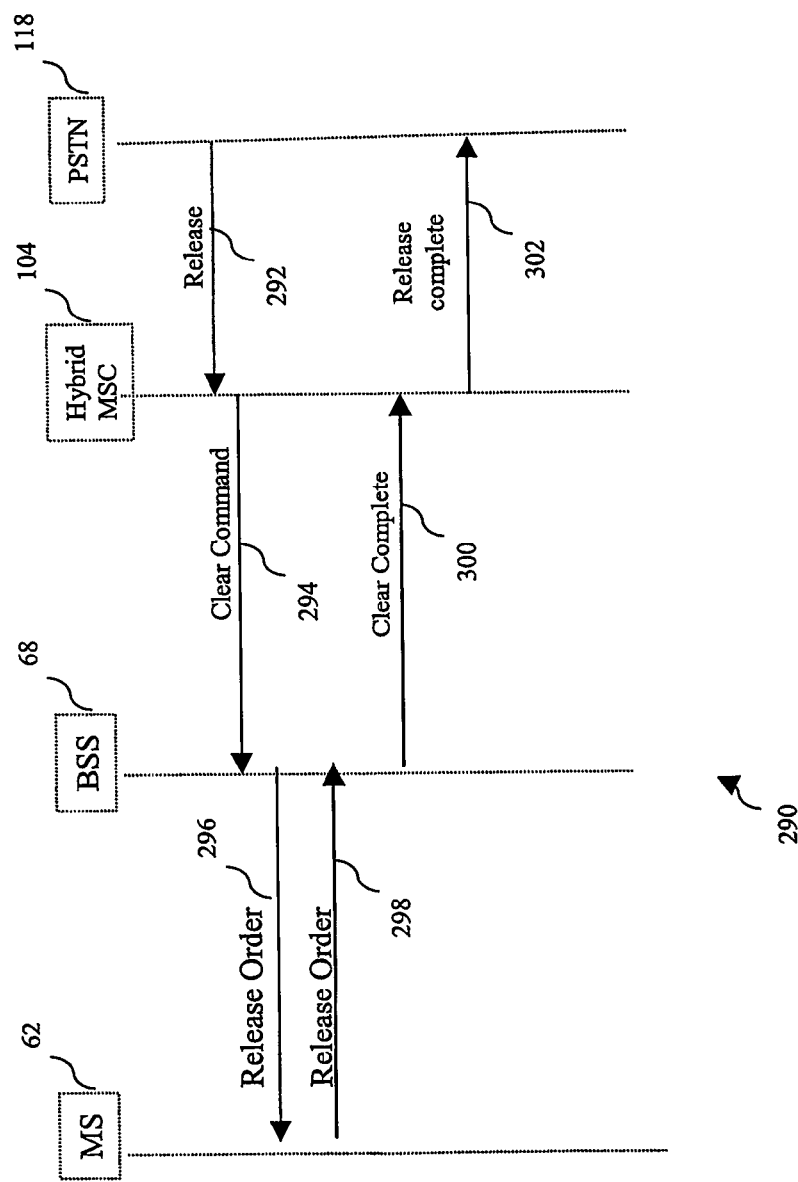

Referring now to FIG. 8, in yet another embodiment, a call flow 290 illustrates the PSTN 118 terminating (e.g., "clearing") a communication session that has been established with the mobile device 62 through the RAN 64 and CN 102 of FIG. 3a. The call flow 290 begins when the PSTN 118 issues a release order to the MSC 104 in step 292, notifying the MSC 104 that it desires to terminate the communication session. The MSC 104 orders the BSS 68 to terminate the communication session by sending a clear command to the BSS 68 in step 294 and the BSS 68 sends a release order to the mobile device 62 in step 296. In step 298, the mobile device 62 acknowledges that it is terminating the communication session by sending a message to the BSS 68. The BSS 68 then informs the MSC 104 in step 300 that the clear has been completed, and the MSC 104 informs the PSTN 118 in step 302 that the communication session has been successfully terminated.

Referring now to FIG. 9, in another embodiment, a call flow 310 illustrates a call forwarding—unconditional service in the RAN 64 and CN 102 of FIG. 3a. The call forwarding unconditional service may enable the automatic forwarding of an incoming communication session to a predetermined destination, such as a telephone number. For example, an individual (the "caller") may desire to establish a voice call with another individual (the "callee"). If the caller has enabled call forwarding unconditional service, the voice call may be automatically routed from a first number (initially dialed by the caller) to a second number (such as the mobile device 62).

The call flow 310 begins when the PSTN 118 sends an IAM to the GMSC 106 in step 312. The GMSC 106 then sends a SRI through the MSC 104 to the HLR 110 in step 314. In step 316, the HLR 110 returns a SRI response to the GMSC 106. With call forwarding—unconditional service enabled, the SRI includes forwarding information rather than the routing information which would be provided if the call forwarding—unconditional service was not enabled. The GMSC 106 then sends an IAM including the forwarding information to the PSTN 118 in step 318.

Referring now to FIG. 10, in another embodiment, a call flow 330 illustrates a call forwarding-busy service in the RAN 64 and CN 102 of FIG. 3a. The call forwarding—busy service may provide forwarding information when a device is "busy" (e.g., currently in use and unable to receive an incoming communication session request). In the present example, the mobile device 62 is busy and cannot accept another call.

The call flow 330 begins when the PSTN 118 sends an IAM to the GMSC 106 in step 332. The GMSC 106 then sends a SRI through the MSC 104 to the HLR 110 in step 334. The HLR sends a PRN message (as described previously in reference to FIG. 6) to the MSC 104 in step 336, and the MSC 104 responds to the message instep 338. In step 340, the HLR 110 then returns a SRI response to the GMSC 106, which in turn sends an IAM utilizing the SRI information to the MSC 104 in step 342. The MSC 104 determines that the destination number being called (e.g., the number of the mobile device 62) is busy in step 344, and sends an IAM with call forwarding information to the PSTN 118 in step 346.

Figure 11:
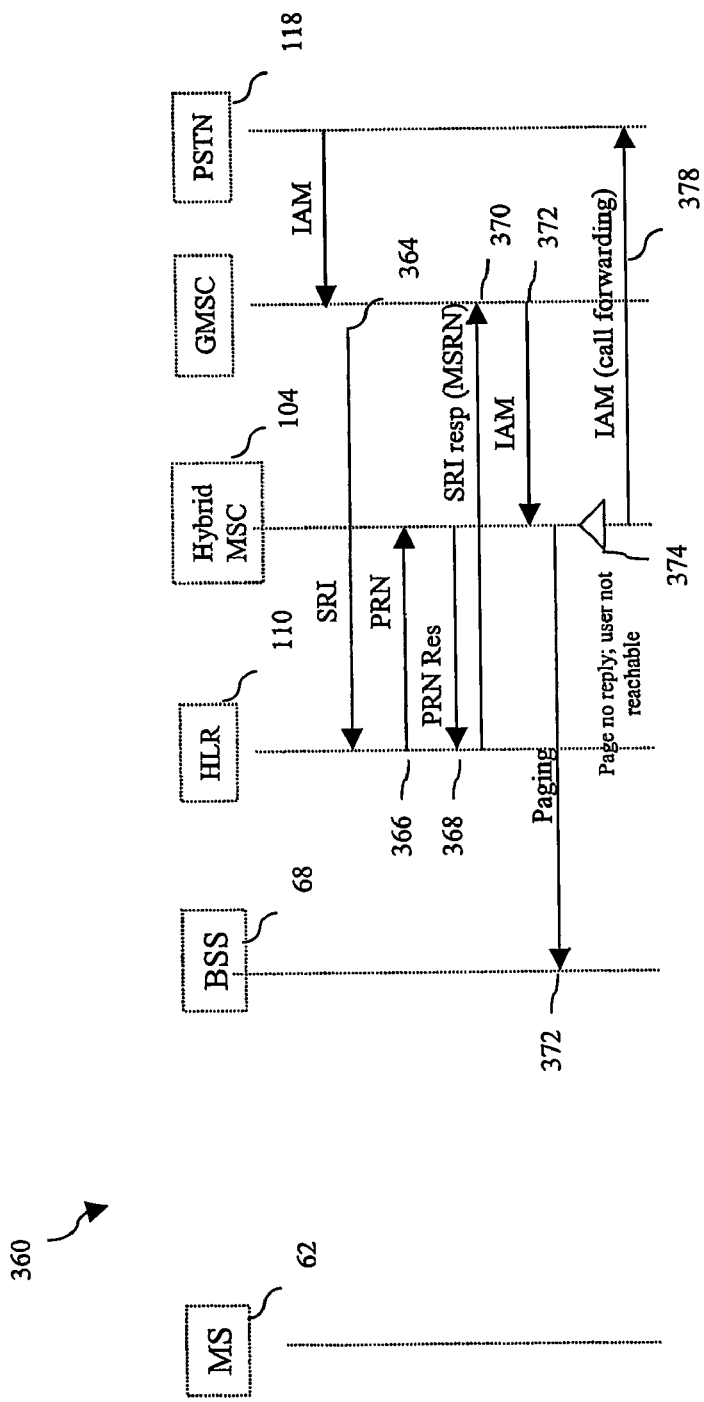

Referring now to FIG. 11, in still another embodiment, a call flow 360 illustrates a call forwarding—not reachable service in the RAN 64 and CN 102 of FIG. 3a. The call forwarding—not reachable service may provide forwarding information when a device is unavailable (e.g., out of range of the network 100, deactivated, or otherwise not able to respond to an incoming request for service). In the present example, the mobile device 62 may fail to respond due to inactivation or being inaccessible to the network 100.

The call flow 360 begins when the PSTN 118 sends an IAM to the GMSC 106 in step 362. The GMSC 106 then sends a SRI through the MSC 104 to the HLR 110 in step 364. The HLR sends a PRN message to the MSC 104 in step 366, and the MSC 104 responds to the message in step 368. In step 370, the HLR 110 returns a SRI response to the GMSC 106, which in turn sends a IAM to the MSC 104 in step 372. The MSC 104 attempts to page the mobile device 62 by sending a page in step 374. When the MSC 104 fails to receive a reply to the page in step 376, indicating that the mobile device 62 has failed to respond, the MSC 104 sends an IAM with call forwarding information to the PSTN 118 in step 378.

Figure 12:
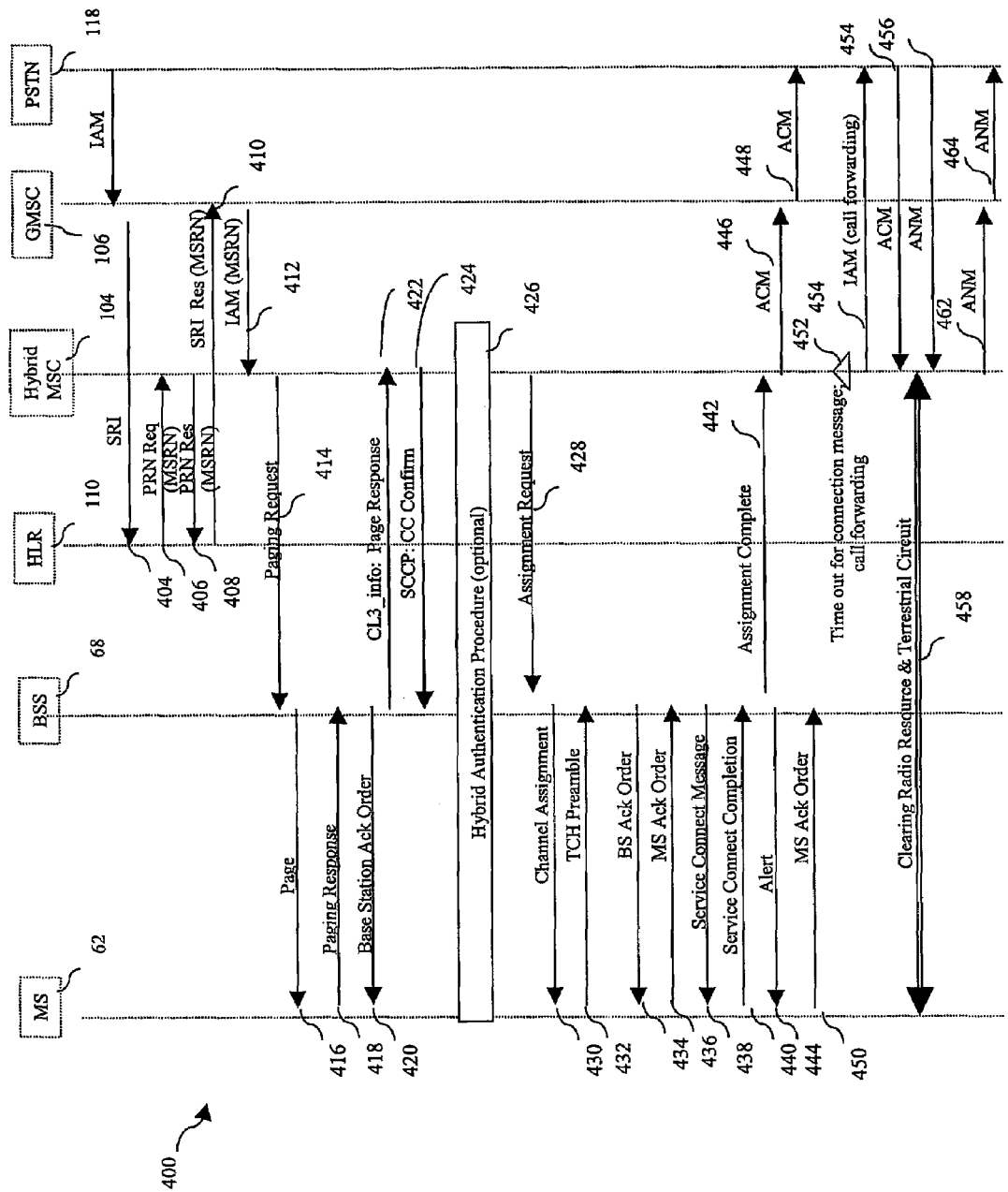

Referring now to FIG. 12, in yet another embodiment, a call flow 400 illustrates a call forwarding—no answer service in the RAN 64 and CN 102 of FIG. 3*a*. The call forwarding—no answer service may provide forwarding information when a device is responsive (e.g., the device is activated, is within range of the network 100, etc.) but a user of the device does not answer. In the present example, the mobile device 62 may respond (e.g., to a page) but the user of the mobile device 62 may fail to answer the call.

The call flow 400 begins when the PSTN 118 sends an LAM to the GMSC 106 in step 402. The GMSC 106 then sends a SRI through the MSC 104 to the HLR 110 in step 404. The HLR sends a PRN message to the MSC 104 in step 406, and the MSC 104 responds to the message in step 408. In step 410, the HLR 110 returns a SRI response to the GMSC 106, which in turn sends an IAM to the MSC 104 in step 412. The MSC 104 sends a paging request to the BSS 68 in step 414, which pages the mobile device 62 by sending a page in step 416. The mobile device 62 responds to the page in step 418, indicating that the mobile device is active and accessible to the BSS 68. In step 420, the BSS 68 sends an acknowledgement to the mobile device 62 and then informs the MSC 104 of the response to the page in step 422. The MSC 104 responds by sending a connection confirm message to the BSS 68 in step 424.

In step 426, an authentication process may occur where the mobile device 62 is authenticated as previously described in reference to FIG. 4. The MSC 104 sends an assignment request to the BB 68 in step 428, and the BSS 68 sends a channel assignment message to the mobile device 62 in step 430. The mobile device 62 sends a TCH preamble message in step 432 to the BSS 68. In step 434, the BSS 68 sends a message to the mobile device 62 acknowledging the order and the mobile device 62 sends the BSS 68 an acknowledgement in step 436. The BSS 68 then sends a service connect message to the mobile device 62 in step 438 and the mobile device 62 returns a service connection complete message in step 440. In step 442, the BSS 68 informs the MSC 104 that the channel assignment requested in step 428 is complete.

The BSS 68 sends an alert message to the mobile device 62 in step 444. In step 446, an ACM is sent from the MSC 104 to the GMSC 106, and from the GMSC 106 to the PSTN 118 in step 448. The mobile device 62 sends an acknowledgement order to the BSS 68 in step 450. In step 452, the MSC 104 times out while waiting for the connection message and resorts to call forwarding. Accordingly, in step 454, the MSC 104 sends an IAM with call forwarding information through the GMSC 106 to the PSTN 118, which returns an ACM in step 456. In step 458, resources which were reserved for the communication session are released and the PSTN 118 sends the MSC 104 an ANM in step 460. The MSC 104 then sends an ANM through the GMSC 106 to the PSTN 118 in steps 462, 464.

Figure 13:
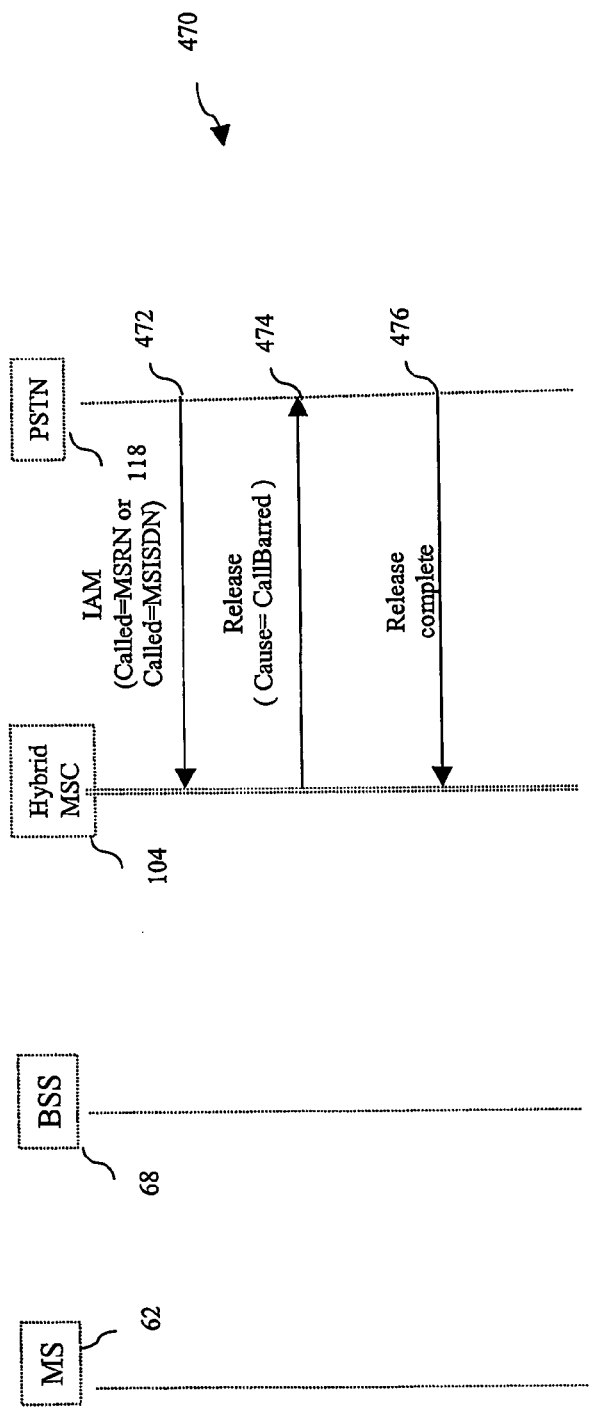

Referring now to FIG. 13, in still another embodiment, a call flow 470 illustrates a call barring—incoming call service in the RAN 64 and CN 102 of FIG. 3*a*. The call barring—incoming call service may refuse to accept an incoming request (e.g., a call terminating at the mobile device 62) based on predefined parameters. In the present example, a user of the mobile device 62 may have barred incoming calls from a particular telephone number associated with the telephone 120.

The call flow 470 begins when the PSTN 118 sends an IAM to the MSC 104 in step 472, where the IAM requests a connection to a MSRN or a mobile subscriber ISDN number (MSISDN). It is noted that the call may go through the GMSC 106 as described previously. The MSC 104 determines that the call is barred and returns a release message to the PSTN 118 in step 474. For example, the MSC 104 may determine that the call originated from the telephone number that was barred by the user of the mobile device 62. In step 476, the PSTN 118 informs the MSC 104 that the release is complete.

Figure 14:
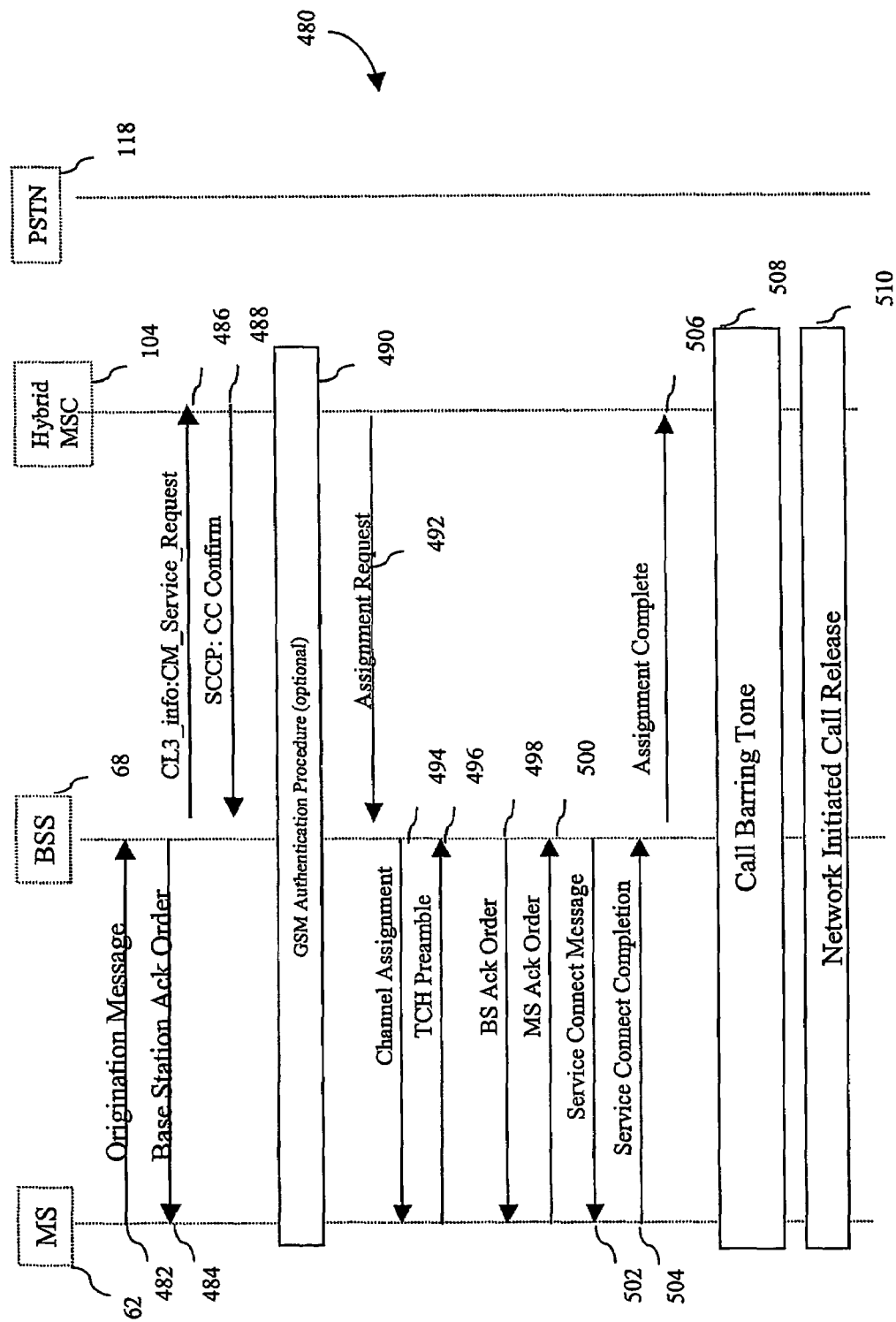

Referring now to FIG. 14, in another embodiment, a call flow 480 illustrates a call barring—outgoing call service in the RAN 64 and CN 102 of FIG. 3*a*. The call barring—outgoing call service may refuse to accept an outgoing request (e.g., a call originating from the mobile device 62) based on predefined parameters. In the present example, a user of the mobile device 62 may have barred outgoing calls to a particular telephone number or to a particular range of numbers. For instance, the user may have barred any outgoing international calls.

The call flow 480 begins when the mobile device 62 sends an origination message to the BSS 68 in step 482. As described previously, the BSS acknowledges the origination message in step 484 and sends a service request to the MSC 104 in step 486. The MSC 104 confirms the connection in step 488 and, in step 490, an authentication process may occur as previously described.

In step 492, the MSC 104 sends an assignment request to the BSS 68, and the BSS 68 sends a message to the mobile device 62 assigning a communications channel in step 494. The mobile device 62 sends a TCH preamble message in step 496 to the BSS 68. In step 498, the BSS 68 sends a message to the mobile device 62 acknowledging the order and the mobile device 62 sends the BSS 68 an acknowledgement in step 500. The BSS 68 then sends a service connect message to the mobile device 62 in step 502 and the mobile device 62 returns a service connection complete message in step 504. In step 506, the BSS 68 informs the MSC 104 that the channel assignment requested in step 492 is complete. A call barring tone is generated in step 508 and resources reserved for the establishment of the communication session are released in step 510.

Figure 15:
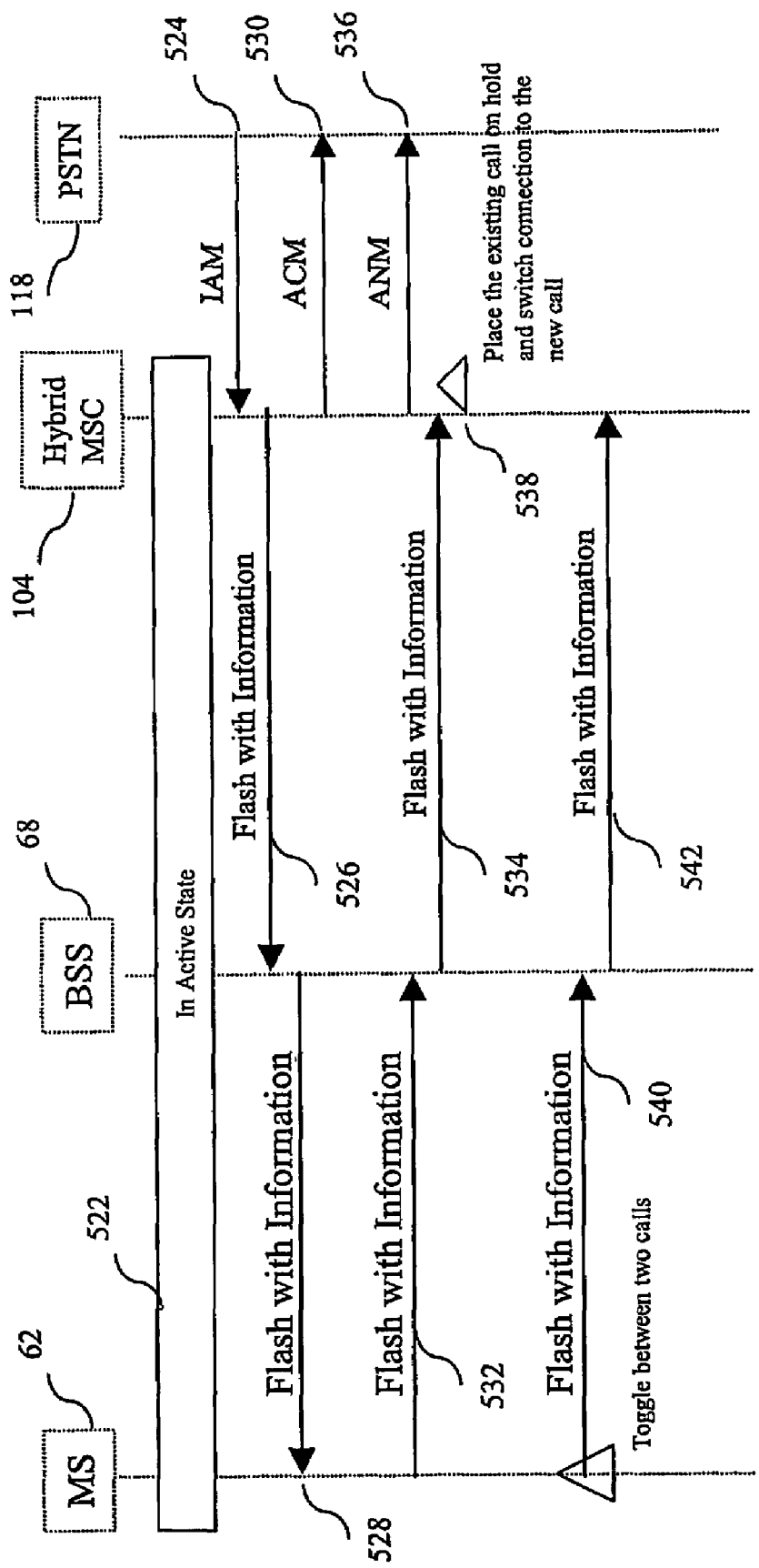

Referring now to FIG. 15, in another embodiment, a call flow 520 illustrates a call waiting and call hold service in the RAN 64 and CN 102 of FIG. 3*a*. The call waiting and call hold service may be a supplementary service that enables a user to put a call on "hold" (e.g., temporarily suspend the call without disconnecting) and accept a "waiting" call (e.g., an incoming call that has not yet been answered). The call waiting and call hold service may be enabled and disabled by sending a flash with information. A flash notifies the network that the mobile device wants to invoke special processing. For example, the information may include a string of digits and end marks that identify a feature to be activated/deactivated, along with additional information such as a personal identification number (PIN).

In the present example, the call flow 520 begins in step 522 with an original active communication session that includes the mobile device 62. The PSTN 118 sends an IAM to the MSC 104 in step 524, which notifies the MSC 104 of an incoming call request. The MSC 104 flashes the BSS 68 with information in step 526 to notify the BSS 68 that there is another call. In step 528, the BSS 68 sends the mobile device 62 a flash with information. The MSC 104 also sends the PSTN 118 an ACM in step 530 notifying the PSTN that the communication session is ready. The mobile unit 72 sends the BSS 68 a flash with information to enable call waiting in step 532, and the BSS 68 sends the MSC 104 the call waiting flash with information in step 534. The MSC 104 then sends the PSTN 118 an ANM in step 536, places the original call (from step 522) on hold and connects the new call (requested in the IAM of step 524) in step 538. The mobile device 62 may toggle between the original call (of step 522) and the new call by sending a flash with information requesting the toggle through the BSS 68 to the MSC 104 in steps 540, 542.

Figure 16:
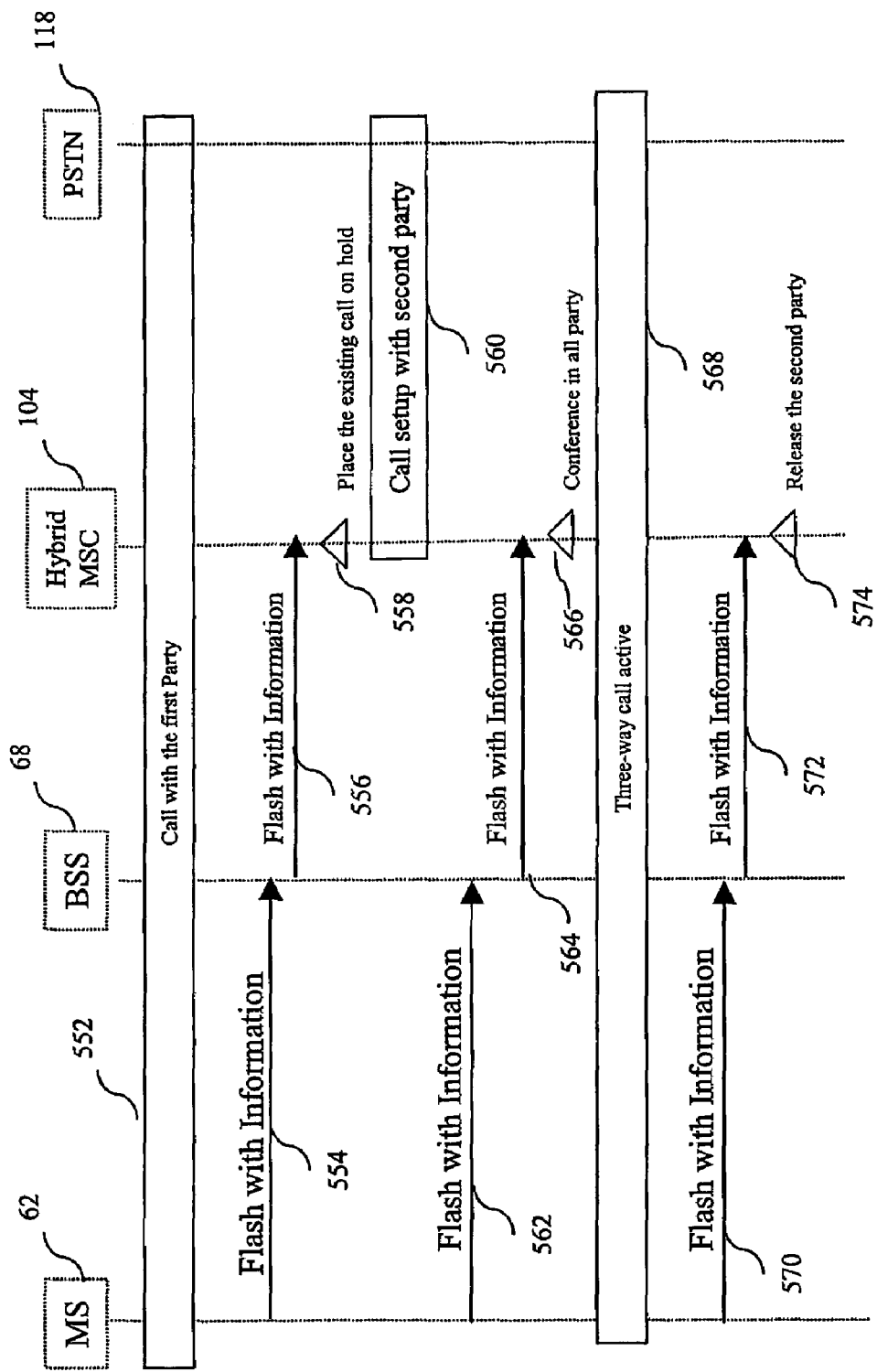

Referring now to FIG. 16, in yet another embodiment, a call flow 550 illustrates a three way call service in the RAN 64 and CN 102 of FIG. 3. The three way call service may be a supplementary service that enables a user to establish multiple communication sessions simultaneously. As previously described with respect to the call waiting and call hold service illustrated in FIG. 15, the three way call service may be enabled and disabled by sending a flash with information.

In the present example, the call flow 550 begins in step 552 with an existing active communication session between the mobile device 62 and another communication device connected to the PSTN 118, such as the wireline telephone 120. In steps 554 and 556, the mobile device 62 sends a flash with information through the BSS 68 to the MSC 104, informing the MSC 104 that a user of the mobile device 62 wants to invoke special processing (in this case, to establish a three way call with the wireline telephone 120 and a second party, such as a second wireline telephone). In step 558, the MSC 104 places the existing session on hold, and then sets up the call with the second party in step 560.

In step 562, the mobile device 62 sends another flash with information to the MSC 104 through the BSS 68 in steps 562, 564. The MSC 104 conferences in the parties in step 566, enabling an active three way call in step 568. To remove the second party, the mobile device 62 flashes the BSS 68 with information in step 570 and the BSS 68 flashes the MSC 104 with the information in step 572. Upon receiving the information, the MSC 104 releases the second party from the call in step 574.

Figure 17:
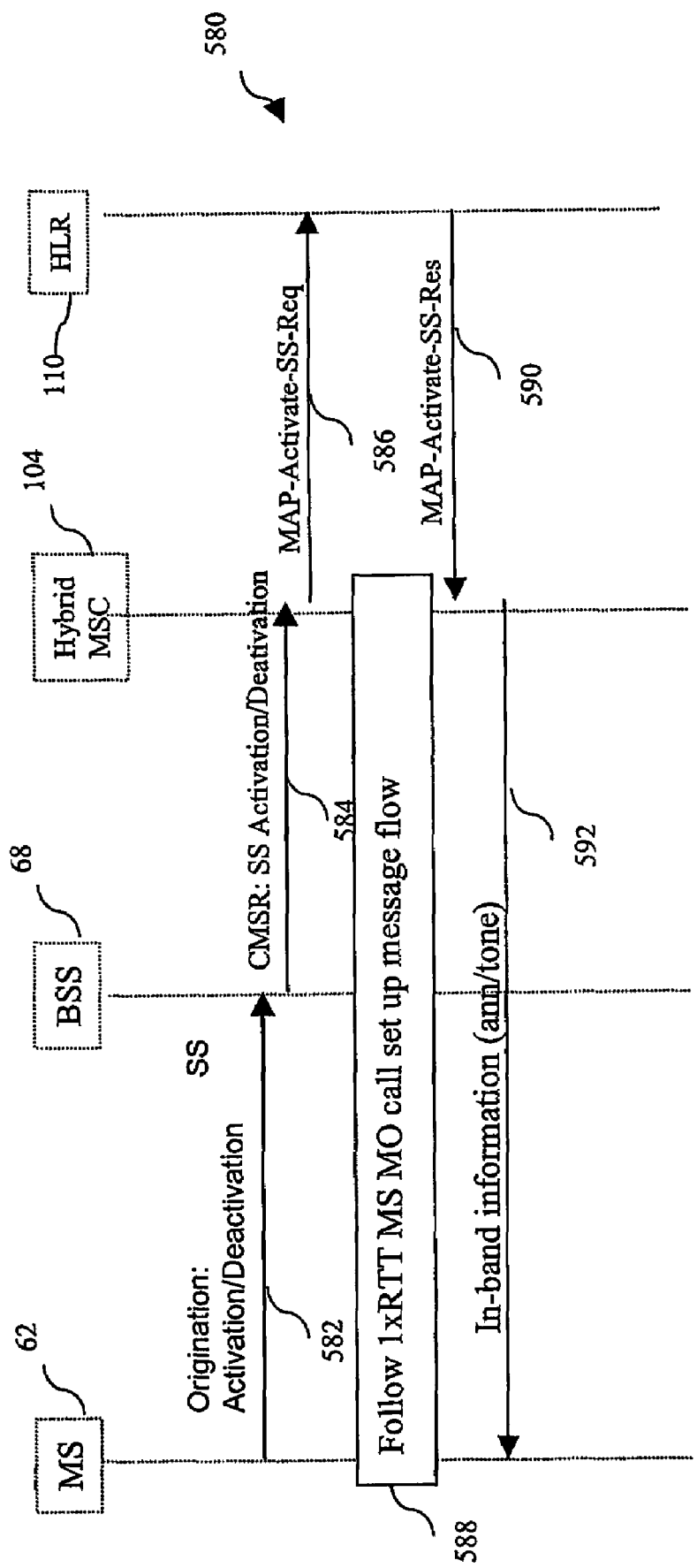

Referring now to FIG. 17, in another embodiment, a call flow 580 illustrates a call flow for a procedure to activate or deactivate a supplementary service that has been subscribed for by a mobile user. The network considered is composed of the RAN 64 and CN 102 of FIG. 3*a*. The service starts when the mobile 62 sends an origination message to the BSS 68 in step 582. The message contains an identification key of the supplementary service that the mobile user wishes to activate or deactivate. The BSS 68 sends a CM Service Request message containing the SS identification key to the MSC 104 in step 584. In step 586, the MSC 104 sends an activate supplementary service request message to the GSM HLR 110 requesting that the HLR 100 set the SS in its database as active for the mobile 62. In a case where the mobile user is requesting a deactivation of the supplementary service, the MSC 104 will send a deactivate supplementary service message to the HLR 110. The HLR 110 sends a response message to the MSC 104 in step 590. The MSC 104 then sets up a connection to the mobile 62 and assigns a radio channel in step 588. When the connection between the mobile 62 and the MSC 104 is established, the MSC 104 sends an indication to the user confirming the request for the supplementary service in question in step 592. For example, the indication may be a voice message or an audible tone.

Figure 18:
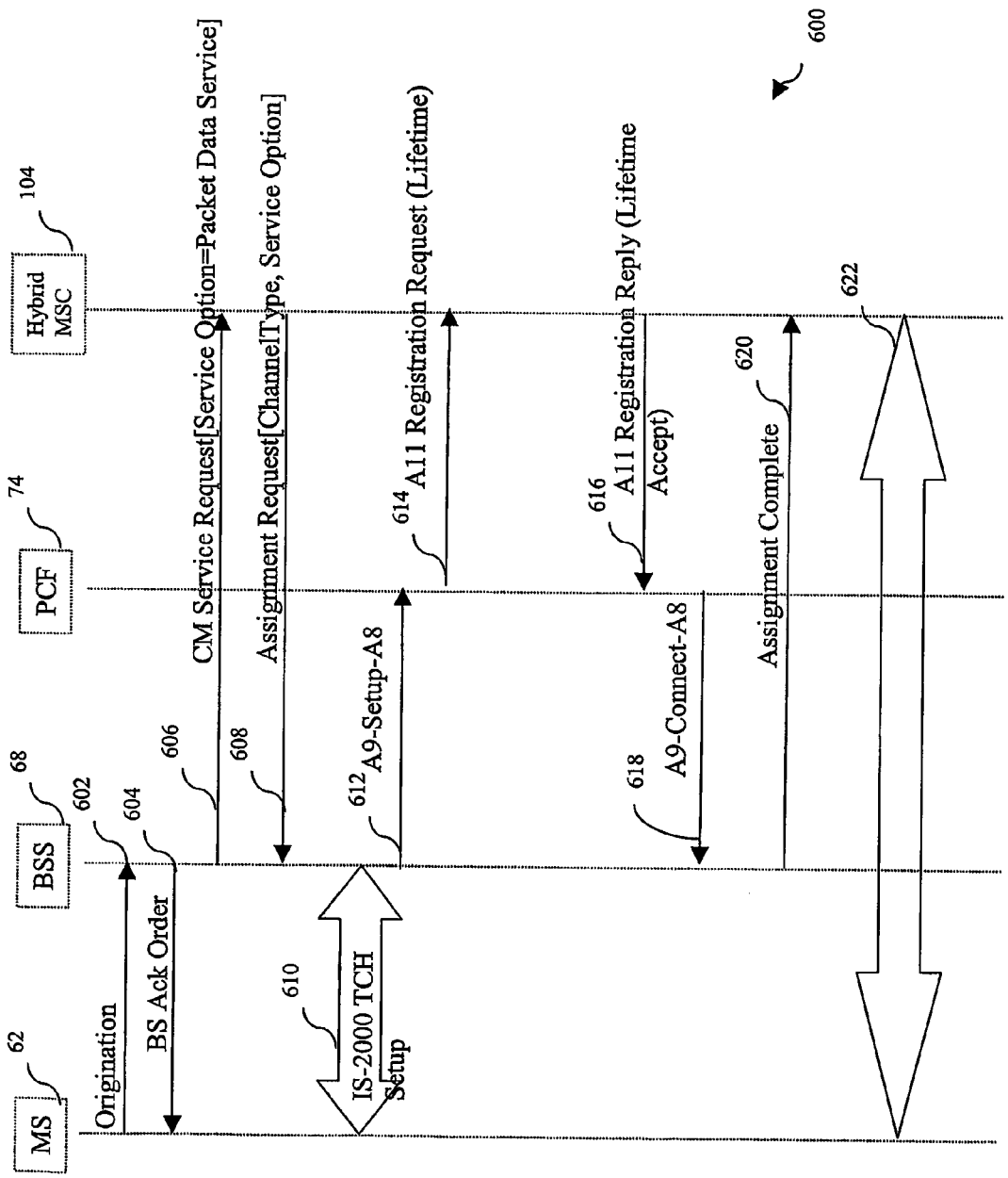

Referring now to FIG. 18, in yet another embodiment, a call flow 600 illustrates a packet data session originated by the mobile 62 through the RAN 64 and CN 102 of FIG. 3*a*. The following example defines three interfaces A8, A9, and A11 as follows. A8 provides a user traffic interface between the BSS 68 and the PCF 74. A9 provides a signaling interface between the BSS 68 and the PCF 74. A11 provides a signaling interface between the PCF 74 and the MSC 104. Other interfaces (not shown) may be provided.

In step 602, the mobile 62 sends an origination order to the BSS 68, which acknowledges the order in step 604. The BSS 68 then sends a CM service request for packet data service to the hybrid MSC 104 in step 606. The MSC 104 responds with an assignment request in step 608 and a traffic channel is established between the mobile 62 and the BSS 68 in step 610. In step 612, a setup message is sent from the BSS 68 to the PCF 74 via the A9 interface. This message requests the setup of an A8 connection between the PCF 74 and the BSS 68. Upon receiving the setup message, the PCF 74 sends a registration request through the A11 interface to the MSC 104 in step 614. The MSC 104 responds with a registration reply in step 616 and the PCF 74 sends the BSS 68 a message that the connection has been setup in step 618. In step 620, the BSS 68 sends the MSC 104 a message that the assignment requested in step 620 is complete and the packet data session is established in step 622.

Figure 19:
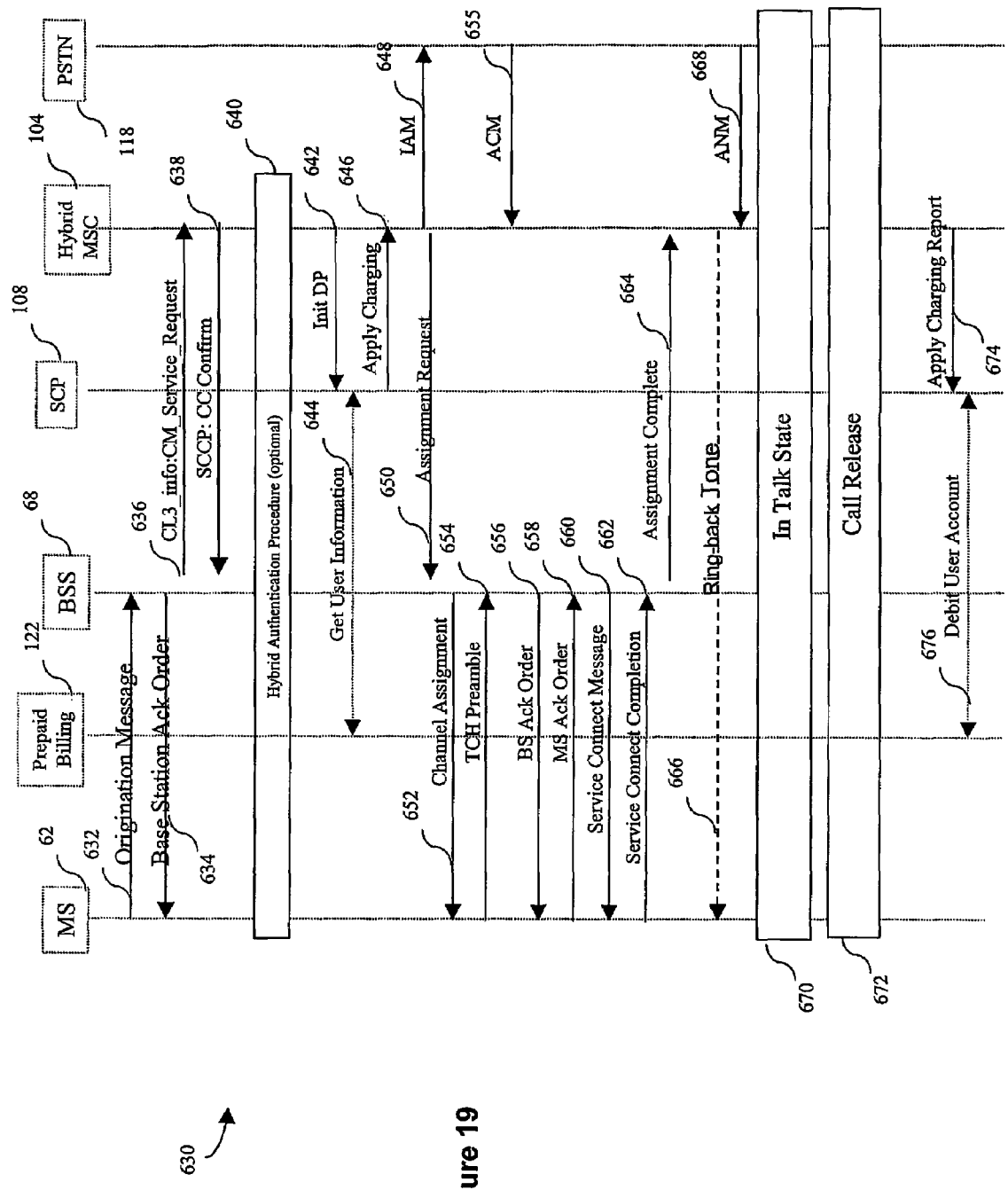

Referring now to FIG. 19, in still another embodiment, a call flow 630 for charging a call originating from the mobile device 62 in the RAN 64 and CN 102 of FIG. 3*a* is illustrated. The communication session is to include the PSTN 118. For instance, the communication session may be to connect the mobile device 62 with the wireline telephone 120. The call flow 630 begins when the mobile device 62 sends a request for service in an origination message to the BSS 68 in step 632. The BSS 68 acknowledges receipt of the origination message in step 634 and sends a service request to the MSC 104 in step 636. In the present example, the service request is constructed as a connection management service request (CM_Service_Request). The MSC 104 confirms the request in step 638 with an SCCP connection confirm message (SCCP: CC). In step 640, an authentication process may occur where the mobile device 62 is challenged and authenticated.

In step 642, the MSC 104 sends an initial detection point message to the SCP 108. The SCP 108 then communicates with the billing system 122 (which in the present example is a pre-paid billing system) to retrieve user billing information in step 644 and sends the MSC 104 a message in step 646 to apply charging. In steps 648 and 650, the MSC 104 sends an IAM to the PSTN 118 and an assignment request to the BSS 68. In response, the BSS 68 sends a message to the mobile device 62 assigning a communications channel in step 652. The mobile device 62 sends a TCH preamble message to the BSS 68 in step 654 to aid the base station in initial acquisition and channel estimation. The PSTN 118 responds to the IAM of step 648 with an ACM in step 655.

In step 656, the BSS 68 sends an acknowledgement order to the mobile device 62, which responds with an acknowledgement order in step 658. The BSS 68 then sends the mobile device 62 a service connect message in step 660 and the mobile device 62 sends the BSS 68 a service connect completion message in step 662. The BSS 68 then sends an assignment complete message to the MSC 104 in step 664. The MSC 104 sends the mobile 62 a ring back tone in step 666 and receives an ANM from the PSTN 118 in step 668. A call state then exists between the mobile 62 and the PSTN 118 in step 670 and the call is released in step 672. After the call is released, a charging report is sent by the MSC 104 to the SCP 108 and an account associated with the mobile 62 is debited in step 676.

Figure 20:
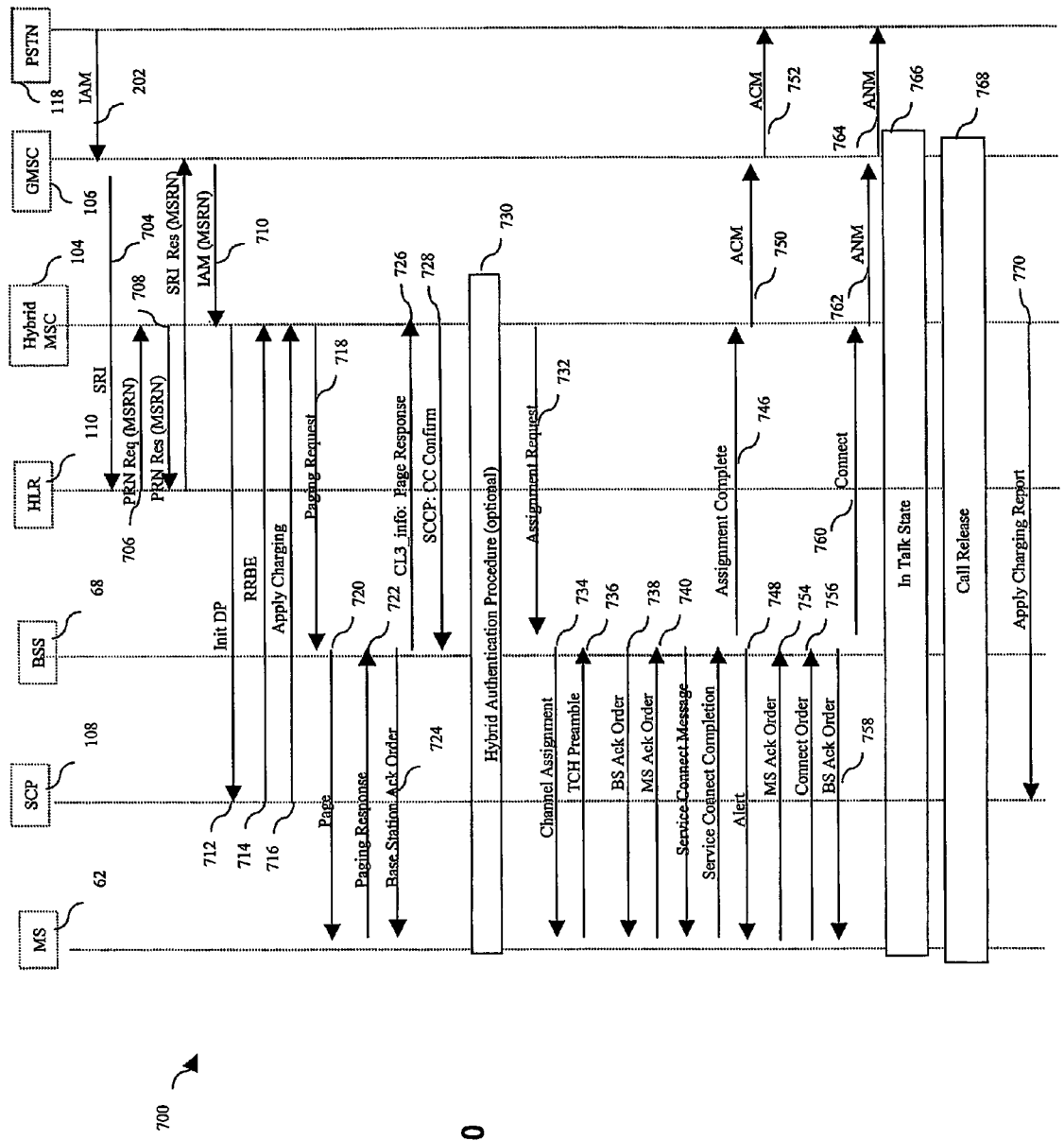

Referring now to FIG. 20, in yet another embodiment, a call flow 700 charging a call originating from the PSTN 118 and terminating at the mobile device 62 in the RAN 64 and CN 102 of FIG. 3a is illustrated. The call flow 700 begins in step 702 with an IAM from the PSTN 118 to the GMSC 106. In step 704, the GMSC 106 sends an SRI to the HLR 110 in step 704. The HLR 110 sends a PRN request to the hybrid MSC 104 in step 706, which in turn sends a PRN response to the HLR 110 in step 708. In step 710, the GMSC 106 sends an IAM to the MSC 104.

In step 712, the MSC 104 sends an initial detection point message to the SCP 108. In steps 714 and 716, the SCP 108 sends a Request Report BCSM Event (collectively "RRBE," where BCSM represents a Basic Call State Model) message and an Apply Charging message to the MSC 104. The RRBE is a message for call processing monitoring. A paging request is sent from the MSC 104 to the BSS 68 in step 718, which sends a page to the mobile device 62 in step 720. In step 722, the mobile device 62 sends a paging response to the BSS 722, which then sends a base station acknowledge order to the mobile device 62 in step 724. In step 726, the BSS 68 then sends a "CL3 info: Page Response" message to the MSC 104, which sends a confirmation message to the BSS 68 in step 728. An authentication procedure may be executed if desired in step 730.

In step 732, an assignment request is sent from the MSC 104 to the BSS 68, which then sends a channel assignment to the mobile device 62 in step 734. The mobile device 62 responds by sending a TCH preamble message to the BSS 68 in step 736. In step 738, the BSS 68 sends an acknowledgement order to the mobile device 62, which responds with an acknowledgement order in step 740. The BSS 68 then sends the mobile device 62 a service connect message in step 742 and the mobile device 62 sends the BSS 68 a service connect completion message in step 744. The BSS 68 then sends an assignment complete message to the MSC 104 in step 746 and an alert message to the MSC 104 in step 748. The MSC 104 sends an ACM through the GMSC 106 to the PSTN 118 in steps 750, 752.

In steps 754 and 756, the mobile device 62 sends an acknowledgement order and a connect order to the BSS 68, which responds with an acknowledgement order in step 758. In step 758, the BSS 68 also sends a connect message to the MSC 104, which sends an ANM through the GMSC 106 to the PSTN 118 in steps 762, 764. The system is in a talk state in step 766 and a call release occurs in step 768. A charging report is then sent from the MSC 104 to the SCP 108 in step 770.

Other embodiments are envisioned that fall within the scope of the present disclosure. For example, although a general switching system is used to describe the above hybrid MSC, a soft switch technology can be used to implement the hybrid MSC, which may then be composed of two parts implemented in independent network entities. One of the entities may handle the control portion of a call and the other entity may handle the bearer portion of the call.

While the preceding description shows and describes one or more embodiments, it will be understood by those skilled in the art that various changes in form and detail may be made therein without departing from the spirit and scope of the present disclosure. For example, it is within the scope of the present disclosure that the BTS, BSS, MSC, and/or mobile device may not exist in the same fashion in other technologies or implementations, but the same functionality may be achieved using other components. Therefore, the claims should be interpreted in a broad manner, consistent with the present disclosure.

What is claimed is:

1. A telecommunications system for providing a wireless service between a mobile device of a wireless access network using CDMA technology and a wireless core network using GSM technology, the system comprising:
   a radio access network in the wireless access network for receiving a first message from the mobile device, wherein the radio access network uses CDMA technology;
   the wireless core network accessible to the radio access network;
   a first means for converting the received first message from CDMA technology to GSM technology, so that the wireless core network is accessible to the mobile device, said first means including
   a processor;
   a memory accessible to the processors; and
   a plurality of instructions stored in the memory for processing by the processor, the instructions for;
   identifying a second message, wherein the second message is based on GMS technology and corresponds to the first message;
   adding information associated with GSM technology to the first message if a comparison between the first and second messages indicates that additional information is needed to make the first message compatible with the GMS technology; and
   removing information associated with CDMA technology from the first message if the comparison between the first and second messages indicates that information should be removed to make the first message compatible with the GSM technology.

2. The system of claim 1 further comprising a second means for converting a third message from GSM technology to CDMA technology.

3. The system of claim 2 wherein the second means includes further instructions stored in the memory for processing by the processor, the instructions comprising:
   analyzing the third message to identify a fourth message, wherein the fourth message is based on CDMA technology and corresponds to the third message;
   adding information associated with CDMA technology to the third message if a comparison between the third and fourth messages indicates that additional information is needed to make the third message compatible with CDMA technology; and
   removing information associated with the GSM technology from the third message if the comparison between the third and fourth messages indicates that information should be removed to make the third message compatible with the CDMA technology.

4. The system of claim 3 wherein at least one of the first and second means is a mobile switching center.

5. The system of claim 1 wherein the means for converting the first message includes a mobile switching center.

6. The system of claim 5 wherein the mobile switching center includes a first interface compatible with CDMA technology and a second interface compatible with GSM technology.

7. The system of claim 1 wherein the means for converting the first message includes a software switch.

8. The system of claim 1 further comprising a second radio access network based on GSM technology, wherein a second mobile device compatible with GSM technology can communicate directly with the wireless core network.

* * * * *